United States Patent [19]

Omatu et al.

[11] Patent Number: 5,729,623
[45] Date of Patent: Mar. 17, 1998

[54] PATTERN RECOGNITION APPARATUS AND METHOD OF OPTIMIZING MASK FOR PATTERN RECOGNITION ACCORDING TO GENETIC ALGORITHM

[75] Inventors: Sigeru Omatu, Tokushima; Fumiaki Takeda, Himeji; Saizo Onami, Himeji; Takashi Kadono, Himeji, all of Japan

[73] Assignee: Glory Kogyo Kabushiki Kaisha, Hyogo, Japan

[21] Appl. No.: 316,446

[22] Filed: Oct. 3, 1994

[30] Foreign Application Priority Data

Oct. 18, 1993 [JP] Japan .................. 5-282166
Oct. 21, 1993 [JP] Japan .................. 5-285527

[51] Int. Cl.$^6$ .............. G06K 9/62; G06K 9/00; G06F 15/18
[52] U.S. Cl. .............. 382/155; 382/135; 382/136; 395/23
[58] Field of Search .............. 382/135, 136, 382/155, 157; 194/317; 395/23

[56] References Cited

U.S. PATENT DOCUMENTS

| | | | |
|---|---|---|---|
| 5,014,219 | 5/1991 | White | 382/157 |
| 5,247,584 | 9/1993 | Krogmann | 382/156 |
| 5,249,259 | 9/1993 | Harvey | 395/23 |
| 5,295,197 | 3/1994 | Takenaga et al. | 382/155 |
| 5,309,525 | 5/1994 | Shimomura et al. | 382/157 |
| 5,321,771 | 6/1994 | Burel et al. | 382/157 |
| 5,467,428 | 11/1995 | Ulug | 395/23 |
| 5,479,570 | 12/1995 | Imagawa et al. | 382/159 |
| 5,485,908 | 1/1996 | Wang et al. | 194/317 |
| 5,503,262 | 4/1996 | Baudat et al. | 194/317 |
| 5,555,439 | 9/1996 | Higashino et al. | 395/23 |

*Primary Examiner*—Andrew Johns
*Assistant Examiner*—Monica S. Davis
*Attorney, Agent, or Firm*—Wenderoth, Lind & Ponack

[57] ABSTRACT

A bill-recognition apparatus includes a neural network having a learning capability and performs high-efficiency pattern recognition of seven kinds of U.S. dollar bills. Pattern image data optically inputted through a sensor is compressed using plurality of column masks, and then a plurality of values representative of images (slab values) are determined. The image data is divided into a large number of strip-shaped segments, and some of theses segments are masked with column areas of masks. The values representative of images compressed through column masks are not influenced by a slight inclination of the pattern image during the reading operation. These values representative of images are inputted to a separation processing unit (neural network). From these values, the separation processing unit calculates separation values corresponding to respective decision patterns associated with pattern images, using weights which have been adjusted to optimum values for respective decision patterns. A correct pattern image is determined from the maximum value of the separation values. The above arrangement allows for a reduction in scale of the neural network and control system. Furthermore, bill recognition may also be achieved by separation processing using a plurality of small-scaled neural networks connected in cascade, or replacing weight functions in the same neural network and performing separation processing a plurality of times for the same slab values (cascade processing). In this way, it is possible to reduce the scale of the neural network and the control system.

16 Claims, 30 Drawing Sheets

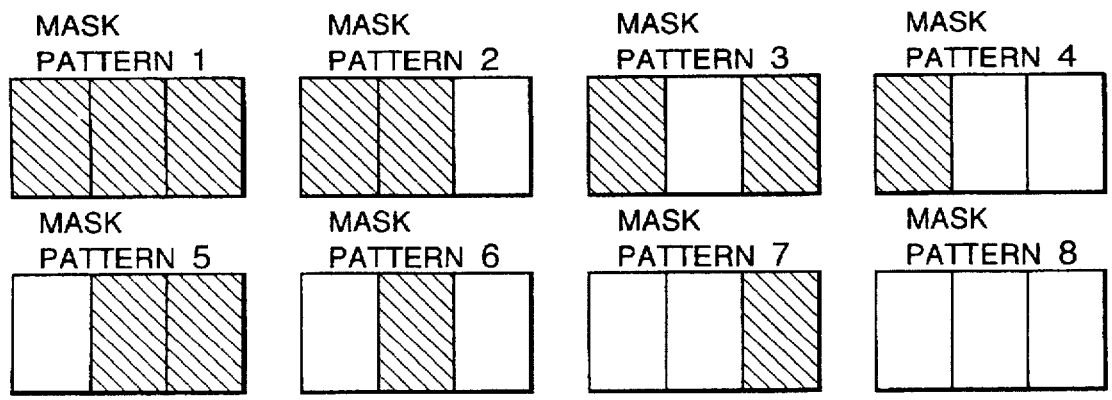
FIG. 4
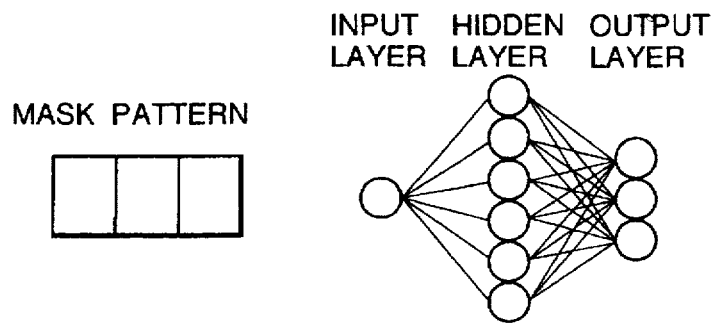
FIG. 5
| MASK | RECOGNITION RATIO | RANKING |
|---|---|---|
| MASK PATTERN 2 | 95% | 2 |
| MASK PATTERN 3 | 90% | 4 |
| MASK PATTERN 4 | 88% | 6 |
| MASK PATTERN 5 | 89% | 5 |
| MASK PATTERN 6 | 99% | 1 |
| MASK PATTERN 7 | 92% | 3 |
| MASK PATTERN 8 | 78% | 7 |
FIG. 6

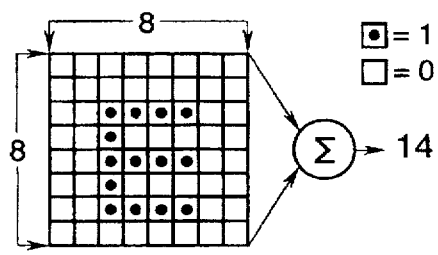
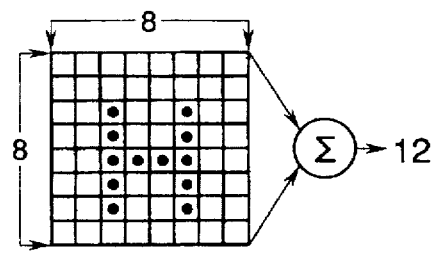
FIG. 14A  FIG. 14B
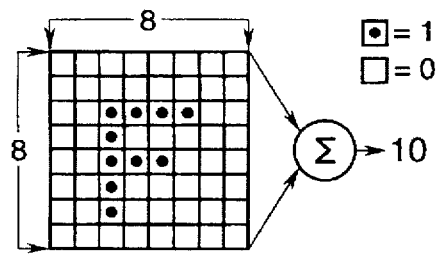
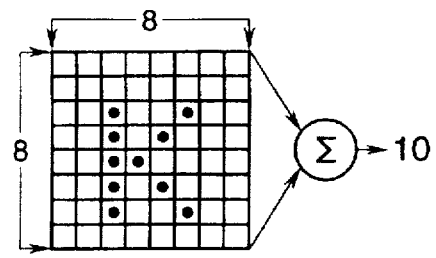
FIG. 15A  FIG. 15B
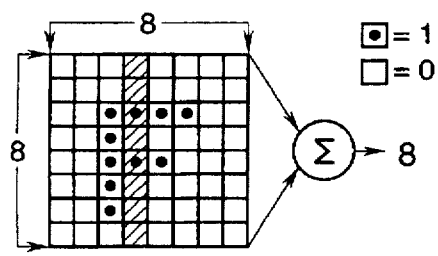
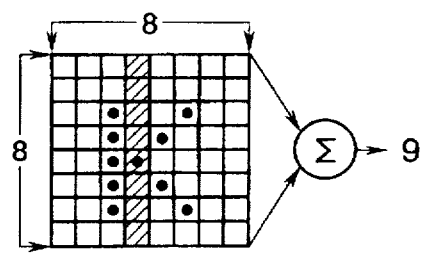
FIG. 16A  FIG. 16B
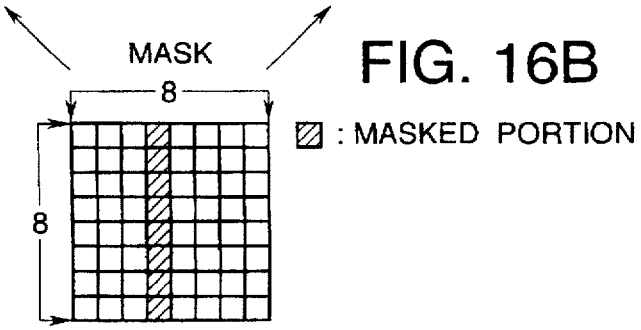
FIG. 16C

MASK INFORMATION ( 0 = OFF, 1 = ON )

UNIT NUMBER    MASK PATTERN

| | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|
| NO. 1  | 0 | 0 | 0 | 0 | 0 | 0 | 0 | 0 | 0 | 0 | 0 | 0 | 0 | 0 | 0 | 0 |
| NO. 2  | 0 | 1 | 1 | 1 | 1 | 1 | 1 | 0 | 1 | 1 | 1 | 1 | 1 | 0 | 1 | 0 |
| NO. 3  | 1 | 0 | 1 | 1 | 1 | 1 | 1 | 1 | 1 | 1 | 1 | 0 | 1 | 1 | 1 | 1 |
| NO. 4  | 1 | 1 | 0 | 1 | 1 | 1 | 1 | 1 | 1 | 1 | 1 | 1 | 1 | 1 | 1 | 1 |
| NO. 5  | 1 | 0 | 1 | 0 | 1 | 0 | 1 | 1 | 1 | 1 | 1 | 1 | 1 | 1 | 1 | 1 |
| NO. 6  | 1 | 0 | 1 | 1 | 0 | 1 | 1 | 1 | 1 | 1 | 1 | 1 | 1 | 1 | 1 | 1 |
| NO. 7  | 1 | 1 | 1 | 1 | 1 | 0 | 1 | 1 | 1 | 1 | 1 | 1 | 1 | 1 | 1 | 1 |
| NO. 8  | 1 | 1 | 1 | 1 | 1 | 1 | 0 | 1 | 1 | 1 | 1 | 1 | 1 | 1 | 0 | 0 |
| NO. 9  | 1 | 1 | 1 | 1 | 1 | 1 | 1 | 0 | 1 | 1 | 1 | 1 | 1 | 1 | 1 | 1 |
| NO. 10 | 1 | 1 | 1 | 1 | 1 | 1 | 1 | 1 | 0 | 1 | 1 | 0 | 1 | 1 | 1 | 1 |
| NO. 11 | 1 | 1 | 1 | 1 | 1 | 1 | 1 | 1 | 1 | 0 | 1 | 1 | 1 | 1 | 1 | 1 |
| NO. 12 | 1 | 1 | 1 | 1 | 1 | 1 | 1 | 1 | 1 | 1 | 0 | 1 | 1 | 1 | 1 | 1 |
| NO. 13 | 1 | 1 | 1 | 1 | 1 | 1 | 1 | 1 | 1 | 1 | 1 | 0 | 1 | 1 | 1 | 1 |
| NO. 14 | 1 | 1 | 1 | 1 | 1 | 1 | 1 | 1 | 1 | 1 | 0 | 1 | 0 | 1 | 1 | 1 |
| NO. 15 | 1 | 1 | 0 | 1 | 1 | 1 | 1 | 1 | 0 | 1 | 1 | 1 | 1 | 0 | 1 | 1 |
| NO. 16 | 1 | 1 | 1 | 1 | 0 | 1 | 1 | 0 | 0 | 1 | 1 | 1 | 1 | 1 | 0 | 1 |

FIG. 24

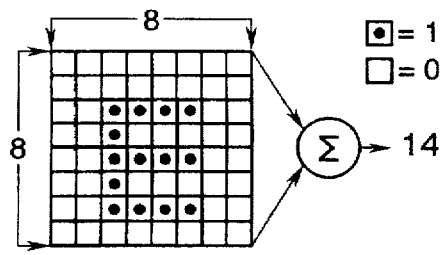
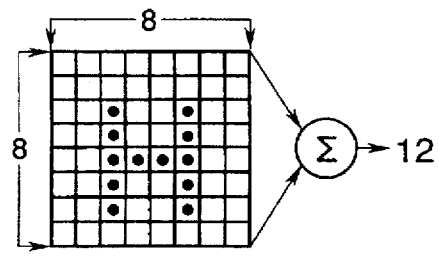
FIG. 31A              FIG. 31B
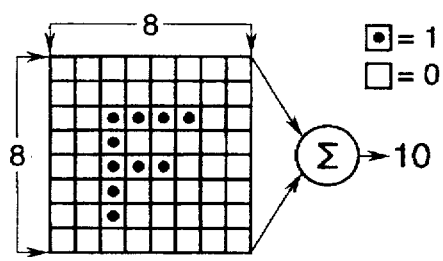
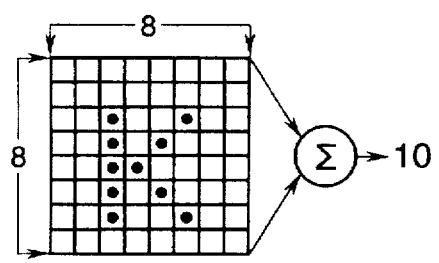
FIG. 32A              FIG. 32B
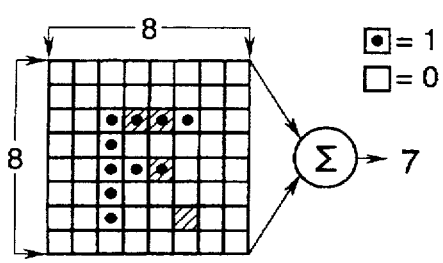
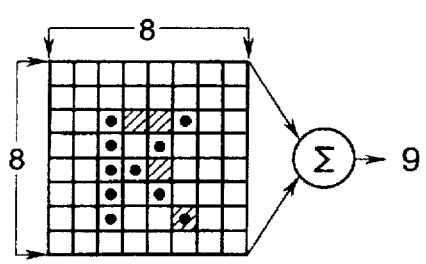
FIG. 33A              FIG. 33B
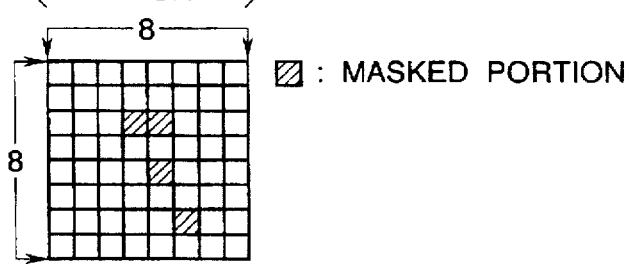
FIG. 33C

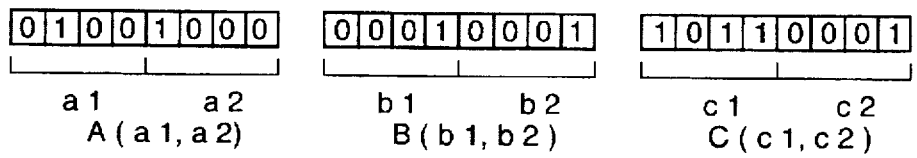
| | a1 | | a2 | | b1 | | b2 | | c1 | | c2 |
A(a1,a2)  B(b1,b2)  C(c1,c2)
FIG. 35
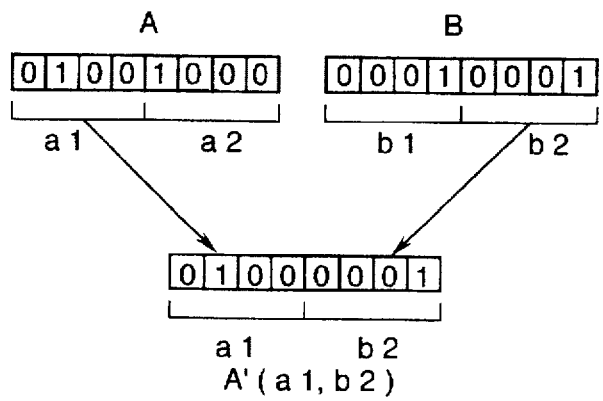
FIG. 36
| | CHROMOSOME | RECOGNITION RATE | SELECTION |
|---|---|---|---|
| A | 0 1 0 0 1 0 0 | 90 % | ○ |
| B | 0 0 0 1 0 0 1 | 92 % | ○ |
| C | 1 0 1 1 0 0 1 | 80 % | ○ |
| A' | 0 1 0 0 0 0 1 | 90 % | ○ |
| B' | 0 0 0 1 1 0 0 | 20 % | × |
| C' | 1 0 1 1 1 0 0 | 95 % | ○ |
| A" | 0 1 0 0 0 0 1 | 95 % | ○ |
| B" | 0 0 0 1 0 0 1 | 50 % | × |
| C" | 1 0 1 1 0 0 1 | 40 % | × |
FIG. 37

FIG. 38A

(A) 1ST GENERATION

| UNIT NO. | MASK PATTERN 1234567890123456 |
|---|---|
| NO. 1 | 0000000000000000 |
| NO. 2 | 1110111111111111 |
| NO. 3 | 1110111111111110 |
| NO. 4 | 1110111111111101 |
| NO. 5 | 1110111111111011 |
| NO. 6 | 1111111111110111 |
| NO. 7 | 1111111110111111 |
| NO. 8 | 1011100010111111 |
| NO. 9 | 1111111101101111 |
| NO. 10 | 1111111101101111 |
| NO. 11 | 1011110111110111 |
| NO. 12 | 1111111111110111 |
| NO. 13 | 1111011100111111 |
| NO. 14 | 1110111111111111 |
| NO. 15 | 1101111101110011 |
| NO. 16 | 1011111111111111 |

DISCRIMINATION RATE 90%

(B)

| UNIT NO. | MASK PATTERN 1234567890123456 |
|---|---|
| NO. 1 | 0111101110111111 |
| NO. 2 | 1000111111111110 |
| NO. 3 | 0100111110001111 |
| NO. 4 | 1000111111111011 |
| NO. 5 | 0000111111110111 |
| NO. 6 | 0000100110101111 |
| NO. 7 | 1000101111111111 |
| NO. 8 | 1010100010111111 |
| NO. 9 | 1111111111111101 |
| NO. 10 | 1100101101111111 |
| NO. 11 | 1011101111111111 |
| NO. 12 | 1000011001101001 |
| NO. 13 | 1111011101101001 |
| NO. 14 | 1110100011000001 |
| NO. 15 | 1101111010010011 |
| NO. 16 | 1011100000010010 |

DISCRIMINATION RATE 93%

(C)

| UNIT NO. | MASK PATTERN 1234567890123456 |
|---|---|
| NO. 1 | 0111101110111111 |
| NO. 2 | 1000111111111110 |
| NO. 3 | 0100111111111111 |
| NO. 4 | 1111111111111111 |
| NO. 5 | 0000111111110111 |
| NO. 6 | 0000100110101111 |
| NO. 7 | 1000101111111111 |
| NO. 8 | 1010100010111111 |
| NO. 9 | 1111111111111101 |
| NO. 10 | 1100101101111111 |
| NO. 11 | 1011101111110111 |
| NO. 12 | 1111101111110111 |
| NO. 13 | 1111011100101001 |
| NO. 14 | 1110100011000001 |
| NO. 15 | 1101111010000011 |
| NO. 16 | 1011100000000000 |

DISCRIMINATION RATE 83%

(G) 3RD GENERATION

| UNIT NO. | MASK PATTERN 1234567890123456 |
|---|---|
| NO. 1 | 0111101110111111 |
| NO. 2 | 1000111111111110 |
| NO. 3 | 0100111100011111 |
| NO. 4 | 1000111111111011 |
| NO. 5 | 0000111111110111 |
| NO. 6 | 0000111110101111 |
| NO. 7 | 1000100000111111 |
| NO. 8 | 1010100000111111 |
| NO. 9 | 1111100000111101 |
| NO. 10 | 1101100000001111 |
| NO. 11 | 1011101111001111 |
| NO. 12 | 1000001100110111 |
| NO. 13 | 1111101101101001 |
| NO. 14 | 1110100001000001 |
| NO. 15 | 1101110100010011 |
| NO. 16 | 1011100000010010 |

DISCRIMINATION RATE 99%

(H)

| UNIT NO. | MASK PATTERN 1234567890123456 |
|---|---|
| NO. 1 | 0111101110011111 |
| NO. 2 | 1000111111111110 |
| NO. 3 | 1110111111111101 |
| NO. 4 | 1111111111111011 |
| NO. 5 | 1111111111110111 |
| NO. 6 | 0000100110001111 |
| NO. 7 | 1000011110111111 |
| NO. 8 | 1010100010111111 |
| NO. 9 | 1111111111111101 |
| NO. 10 | 1111110110111111 |
| NO. 11 | 1011110111111111 |
| NO. 12 | 1111110111110111 |
| NO. 13 | 1111101100111111 |
| NO. 14 | 1110100011111111 |
| NO. 15 | 1101110111110011 |
| NO. 16 | 1011100001111100 |

DISCRIMINATION RATE 98%

(I)

| UNIT NO. | MASK PATTERN 1234567890123456 |
|---|---|
| NO. 1 | 0111101110011111 |
| NO. 2 | 1000111111111110 |
| NO. 3 | 1110111111111101 |
| NO. 4 | 1111111111111011 |
| NO. 5 | 1111111111110111 |
| NO. 6 | 0000100110001111 |
| NO. 7 | 1000011110111111 |
| NO. 8 | 1010100010111111 |
| NO. 9 | 1111111111111101 |
| NO. 10 | 1111110110111111 |
| NO. 11 | 1011110111111111 |
| NO. 12 | 1111110111110111 |
| NO. 13 | 1111101100101001 |
| NO. 14 | 1110100011000001 |
| NO. 15 | 1101110101000011 |
| NO. 16 | 1011100000000000 |

DISCRIMINATION RATE 96%

NOTE: NUMERALS OF MASK PATTERN REPRESENT MASK POSITIONS

PATTERN RECOGNITION APPARATUS AND METHOD OF OPTIMIZING MASK FOR PATTERN RECOGNITION ACCORDING TO GENETIC ALGORITHM

BACKGROUND OF THE INVENTION

1. Field of the Invention

The present invention relates to a pattern recognition apparatus for recognizing patterns of currencies (coins and bills), characters, etc., using a neural network. More particularly, the present invention relates to a pattern recognition apparatus which reduces the data size of a pattern image by performing masking with plural strip-shaped masks or mesh-shaped masks thereby effectively accomplishing separation processing regardless of displacement in location of a pattern image.

Further, the present invention relates to a system with a neural network for recognizing a pattern formed on a paper sheet such as a bill. In particular, the present invention relates to a neural bill-recognition apparatus using random masks, in which a pattern image to be recognized is covered with column masks whose column areas are arranged parallel to the bill-transfer direction, thereby compressing the pattern image and thus performing high-efficiency pattern separation processing with a small-scale system. Still more, the present invention relates to a method of optimizing a mask for use in pattern recognition according to a genetic algorithm, wherein the mask is used to mask an optical pattern image formed on a paper sheet such as a bill thereby discriminating the type of the paper sheet based on a neural network technique.

2. Description of the Prior Art

In conventional techniques, types of paper sheets such as bills are basically discriminated based on the difference in width among different types of bills. In the case of Japanese bills of "YEN", there are differences in colors and locations of watermarks among different types of the bills, and thus it is possible to correctly discriminate them only by examining some comparison points having characteristic features. In the case of U.S. dollar bills, however, it is not easy to correctly discriminate them because all U.S. bills have similar sizes and similar picture patterns printed by single-color gravure printing.

One technique to discriminate such types of the bills is to retrieve the whole area of an image by performing a two-dimensional optical scanning on the surface of a bill. In this technique, however, it is required to process a great amount of image data, and therefore it takes a long time for a currently-available micro-computer system to process the image data. Thus, it is difficult to use the above technique in practical use. Therefore, in practical techniques, characters printed on the bill which represent the type of the bill are partially read for discrimination, or otherwise, discrimination is done, based on one-dimensional optical data obtained during the transfer of the bill (refer to U.S. Pat. No. 4,973,851).

Another known technique which can provide better discrimination ability compared to the above-described techniques is to employ a neural network technique which is based on a model of information transfer in a neural network of a living evolution. This neural network technique has great advantages in self-organization of algorithms by means of learning and interpolation of the information as well as in parallel processing, and thus this technique is suitable for use in pattern recognition. In particular, self-organization of algorithms by means of learning can reduce a human task of finding characteristic feature parameters of the bill experimentally.

FIG. 1 illustrates an example of a conventional neural network technique. In this recognition apparatus shown in FIG. 1, a character or the like formed on an object 1 to be discriminated is read by an image sensor 2 to obtain an input image 3. In the example shown in FIG. 1, the input image 3 is divided into 8×8 segments, and thus input information obtained is represented by D(i, j) (i=1, ..., 8, j=1, ..., 8) associated with 64 pixels. These 64-pixel data are directly input to a separation processing unit 5. In the above processing, an input layer of the separation processing unit 5 has to have 64-neural elements corresponding to respective pixels. Based on the input information, the pattern recognition is done via the neural network.

In such a conventional pattern recognition system, however, the number of the input information applied to the separation processing unit 5 should be equal to the number of the pixels associated with the input image 3, and therefore the number of neurons (neural elements) in the input layer should also be equal to the number of the pixels. This means that the input layer has to have a great number of neurons, and correspondingly a hidden layer also has to have a great number of neurons. Therefore, the conventional technique requires a large-scale separation processing unit 5 to accomplish the pattern recognition.

The image processing can be done using an edge extraction technique and a binarization technique. To extract characteristic features of a bill according to these techniques, however, a great number of pixels have to be processed to examine a bill image in great detail. Furthermore, these techniques are too slow for practical use. There is another type of known technique called a neural network which is based on a model of information transfer in a neural network of a living evolution. This neural network technique has great advantages in self-organization of algorithms by means of learning and interpolation of information as well as in parallel processing, and thus this technique is suitable for use in various types of the pattern recognition. In particular, the self-organization of algorithms by means of learning can reduce a human task of finding characteristic feature parameters of a bill experimentally. In fact, some bill-recognition systems using the neural network techniques have been developed. In particular, it has been strongly desired to develop a reasonable scale of the neural network which can correctly recognize various kinds of bills which are the same in size and color tone as in the case of U.S. dollar bills.

In the practical processing, however, the size of image data of a bill depends on the image sensing area of a sensor, which has for example 216×30 pixels. Therefore, the input layer and the hidden layer each have to have 6480 neurons. If it is assumed that the output layer has seven neurons (corresponding to seven types of the bills), then the number of weights associated with interconnection among neurons becomes as huge as 6,480×6,480+6,480×7, that is "4×10⁶". One known technique to solve the above problem with discrimination of bills is to extract portions having characteristic features by that excluding similar portions. This can be done by masking some pixels of an optical pattern of the bill so that the characteristic features appear.

If there are "n" candidates for column masks in an image frame, as shown in FIG. 2A, it is possible to select either "1" or "0" for each column mask wherein "1" indicates that the corresponding column is masked and "0" indicates that the corresponding column is not masked. Therefore, a mask can be represented by a {1, 0} pattern. The number of possible mask patterns is "2ⁿ", as shown in FIG. 2B.

In the case of n=3, for example, an image frame is divided into three segments or columns as shown in FIG. 3A. In this case, there can be eight mask patterns as shown in FIG. 3B. These eight mask patterns on the image frame are represented in FIG. 4. Of these mask patterns, the mask pattern 1 implies that the whole surface of the image data is masked. This means that no data is applied to the input of the neural network. Therefore, this mask pattern is unsuitable. The mask pattern 8 does not mask any columns. In this case, the neural network can have some input data. Therefore, this mask pattern 1 will be regarded as one of mask patterns in the following discussion. The neural network learns these mask patterns 2 through 8. After the learning is completed, discrimination is done for data which have not been learned yet, and results are evaluated. For example, when YEN bills (1,000, 5,000 and 10,000 YEN bills) are discriminated by the neural network system including one neuron in an input layer, 6 neurons in a hidden layer and 3 neurons in an output layer as shown in FIG. 5, it is possible to do learning for all cases since the number of mask patterns are not huge. Then, the generalization ability obtained by the learning is evaluated. That is, the correct bill-recognition ratio for data which have not been learned yet is evaluated. In this example, as shown in FIG. B, the mask pattern 6 has the highest correct recognition ratio, which means that this mask is the most suitable.

However, the mask size required for an actual image data of a bill consisting of 216×30 pixels will be one pixel (horizontal)×30 pixels (vertical) if it is assumed that the mask has column-shaped patterns. If masking is done for the whole area of the image data, the number of the mask patterns will be "$2^{216}-1$" (the entirely-masked pattern is not included). This number is so great that this technique cannot be used in practical use.

Another technique is to determine locations of the mask patterns by using random numbers. In this case, however, when portions which are not useful for the discrimination are covered, it is impossible to obtain a characteristic feature of image data. This means that efficient learning is impossible and learning is not converged in some cases in which unsuitable mask locations are selected.

SUMMARY OF THE INVENTION

In view of the above, it is a first object of the present invention to provide a pattern recognition apparatus which has a reduced-scale separation processing unit which can perform reliable pattern recognition using a small number of input data applied to an input layer of the separation processing unit (hereafter, the number of input data of this kind will be referred to as "slab number").

It is a second object of the present invention to provide a neural pattern recognition apparatus including a reduced-scale separation processing unit which can perform reliable pattern recognition using a small number of input data applied to an input layer of the separation processing unit, wherein various bills such as U.S. bills which are very similar in size, color tone and picture patterns are distinguished by the neural network based on a model of a neural network of a living evolution in conjunction with random masks for partially covering an image.

It is a third object of the present invention to provide a method of optimizing a mask for use in pattern recognition for discrimination of paper sheets by using a genetic algorithm based on computer simulation of crossover, selection and mutation of living evolution, which are three important factors in evolution processes of the living.

According to one aspect of the present invention, for achieving the object described above, there is provided a pattern recognition apparatus comprising; a sensor for optically or magnetically detecting a pattern image of an object to be recognized; a pre-processing unit for converting the pattern image data detected by said sensor into a plurality of values representative of the image, using a plurality of strip-shaped masks each having a large number of rectangular segments wherein strip-shaped areas of some of the segments are closed; a separation processing unit for receiving in parallel said plurality of values representative of the image, and then calculating separation values corresponding to respective decision patterns associated with the pattern image, using weights which have been adjusted to optimum values for respective decision patterns; and a decision unit for detecting the maximum or minimum value of the separation values and then outputting a decision pattern corresponding to the maximum or minimum value as a pattern image of the object.

According to another aspect of the present invention, there is provided a pattern recognition apparatus comprising; a sensor for optically or magnetically detecting a pattern image of an object to be recognized; a pre-processing unit for converting the pattern image data detected by said sensor into a plurality of values representative of the image, using a plurality of mesh-shaped masks each having a large number of rectangular segments wherein some of said segments are closed; a separation processing unit for receiving in parallel said plurality of values representative of the image, and then calculating separation values corresponding to respective decision patterns associated with the pattern image, using weights which have been adjusted to optimum values for respective decision patterns; and a decision unit for detecting the maximum or minimum value of the separation values and then outputting a decision pattern corresponding to the maximum or minimum value as a pattern image of the object.

According to still another aspect of the present invention, there is provided a neural bill-recognition apparatus using random masks, comprising: image inputting means for inputting an optical pattern image of a paper sheet to be recognized, memory means for storing image data inputted by the image inputting means; image extracting means for extracting an optical pattern image associated with the paper sheet from the image data stored in the memory means; a pre-processing unit which randomly covers the optical pattern image extracted by the image extracting means with a plurality kinds of column masks arranged in the direction parallel to the transfer direction of the paper sheet, and which further converts the total numbers of pixels of the optical pattern image which are not masked into slab values; a separation Processing unit in a neural network for receiving the slab values and then calculating separation values corresponding to respective decision patterns associated with the pattern image, using weights which have been adjusted to optimum values for respective decision patterns; and a decision unit in the neural network for detecting the maximum or minimum value of said separation values and then outputting a decision pattern corresponding to the maximum or minimum value representing an optical pattern image of the paper sheet.

Further, according to another aspect of the present invention, there is provided a method of optimizing a mask for use in pattern recognition according to a genetic algorithm, comprising the steps of: inputting an optical pattern image of a paper sheet to be discriminated, and storing image data associated with the pattern image;

extracting an optical pattern image associated with only the paper sheet from the stored image data; masking the extracted optical pattern image with a plurality of masks; coding the masks, and assigning genes to the coded masks; inputting the sum of image data, which is masked with a mask pattern comprising the masks, to a neural network, and making the neural network learn to discriminate the paper sheet; evaluating the discrimination results, and performing selection on said masks according to whether the masks have achieved a predetermined discrimination ability level; performing crossover of genes on the mask patterns which have survived, or introducing mutation to the genes, thereby alternating genes on the mask patterns; and making the neural network do the learning with the mutated mask patterns; wherein the above steps are performed repeatedly within a predetermined number of alternations of generations until a predetermined goal of discrimination ability has been achieved; thereby performing optimum arrangement on the masks.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a schematic diagram illustrating a specific example of optimization of the mask shown in FIGS. 3A and 3B according to a conventional technique;

FIG. 5 is a schematic diagram illustrating a specific example of optimization of the mask shown in FIGS. 3A and 3B according to a conventional technique;

FIG. 6 is a schematic diagram illustrating a specific example of optimization of the mask shown in FIGS. 3A and 3B according to a conventional technique;

FIGS. 14A and 14B are schematic diagrams illustrating slab values for use in the present invention;

FIGS. 15A and 15B are schematic diagrams illustrating slab values for use in the present invention;

FIGS. 16A to 16C are schematic diagrams illustrating a column mask for use in the present invention;

FIG. 24 is a schematic diagram illustrating an example of mask information for use in the present invention;

FIGS. 31A and 31B are schematic diagrams illustrating slab values used in the present invention;

FIGS. 32A and 32B are schematic diagrams illustrating slab values used in the present invention;

FIGS. 33A to 33C are schematic diagrams illustrating slab values used in the present invention;

FIG. 35 is a schematic diagram illustrating coding of a mask according to the method of the present invention;

FIG. 36 is a schematic diagram illustrating crossover of a mask according to the method of the present invention;

FIG. 37 is a schematic diagram illustrating correct discrimination ratios of masks to which optimizing process according to the method of the present invention is applied, wherein whether selection is performed on the masks or not is also shown.

DESCRIPTION OF THE PREFERRED EMBODIMENTS

In the present invention, pattern recognition of currencies or the like is performed using a neural network having learning capability. Furthermore, in the present invention, the data size associated with a pattern image which is optically or magnetically detected by a sensor is reduced by using a plurality of strip-shaped masks or mesh-shaped masks. The strip-shaped masks and the mesh-shaped masks each have a large number of rectangular segments respectively. Some of the rectangular segments are closed, wherein the closed segments are determined randomly using, for example, random numbers. Values representative of an image, which are compressed by using the strip-shaped masks or the mesh-shaped masks, are inputted to the separation processing unit (neural network). The separation processing unit calculated a separation value for each decision pattern associated with the image pattern, using weights which have been optimized to recognize each decision pattern. Recognition of the pattern image is carried out based on a maximum value (or a minimum value) of calculated separation values. The above arrangement allows a reduction in scale of the neural network.

In a conventional pattern recognition apparatus using a neural network, a pattern of a bill (in particular U.S. bills) is recognized by directly inputting an information detected by a sensor of the system into the neural network. As a result, the neural network has to have weights for all input information. This causes the scale of the neural network to become great. In view of the above, in the present invention, the input information is compressed through a plurality of column masks or mesh masks in the pre-processing unit. From an image covered with these column masks, or mesh masks, representative image values (slab values) are determined. Each column mask or mesh mask has a large number of rectangular segments arranged in such a manner that longer sides of the segments are in parallel to a transfer direction of the bills, wherein some plural number of the segments are closed.

Figure 7:
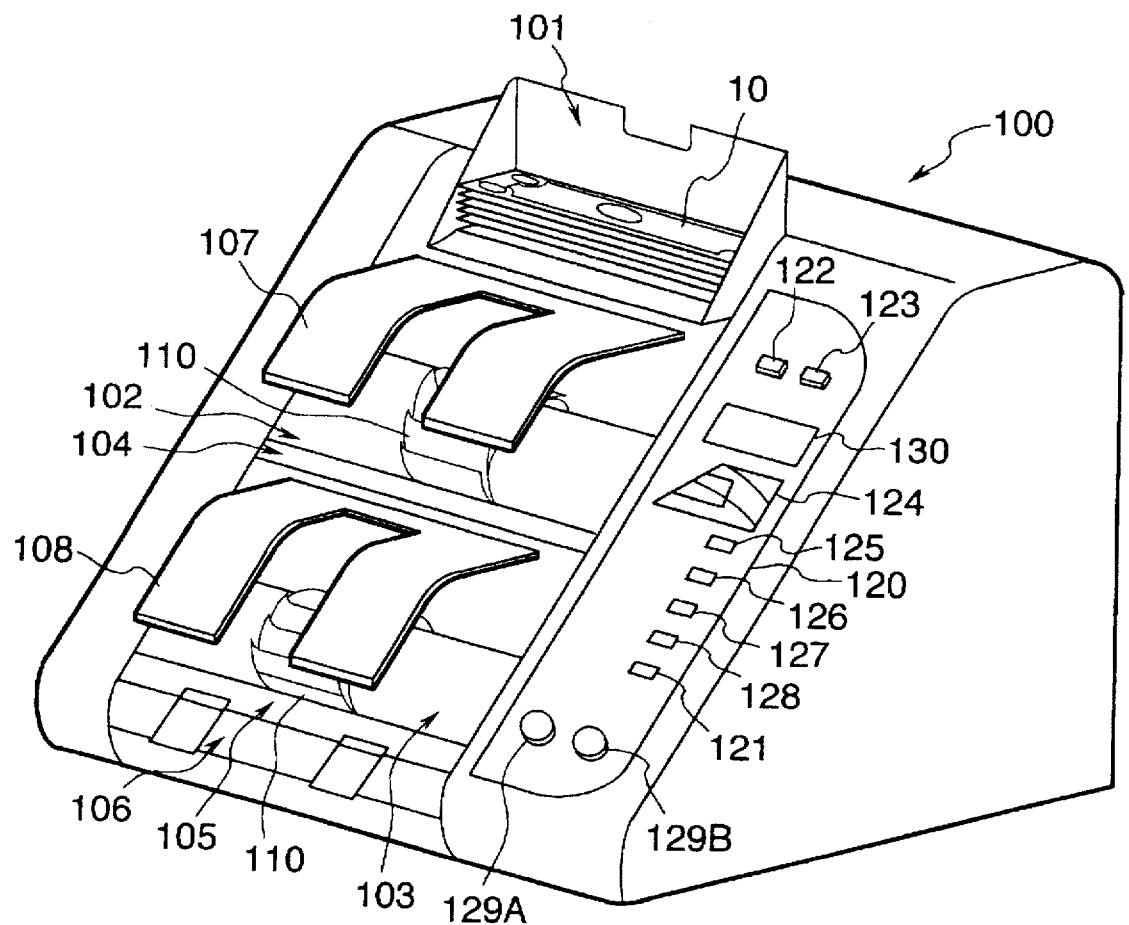
FIG. 7 is a perspective view illustrating the outside appearance of a neuro-bill recognition apparatus using random masks according to the present invention.

FIG. 7 illustrates an outside appearance of an embodiment of a bill recognition apparatus 100 according to the present invention. There is provided a panel 120 on the right side in the front of the bill recognition apparatus 100. On the upper portion, there is provided a hopper 101 for receiving bills 10 (U.S. dollar bills) to be recognized. The bills 10 placed in the hopper 101 are fed in one by one through bill feeders with feeding rollers 110. Bills to be selected are stored in a first stacker 104, and recognized bills are stored in a second stacker 105. Rejected bills are stored in a rejected bill stacker 106. A guide plate 107 which can be opened is disposed above the first stacker 104, and a guide plate 108 which can also be opened is disposed above the second stacker 105. These mechanisms will be described later.

The panel 120 has a power switch 121, a start/stop button 122 for starting and stopping the recognition operation in a toggle fashion, and a clear button for clearing a display. Below these elements, there are also provided a display 130 for displaying a counted number (or value) of bills, and a guidance display 124 for displaying the failure location in the bill-recognition apparatus and the type of failure. Furthermore, the following switches or buttons are disposed in line up to down: a mode switch 125 for selecting a recognition mode, a learning mode and a test mode; a batch switch 126 for setting a batch mode in which the counting is stopped when the designated number of bills has been counted; a bill number designation switch 127 for designating the number of bills to be recognized wherein the designated bill-number is incremented (by 10 for example) each time the switch is pressed; and a rejection setting button for setting the rejection mode such as that bills whose types are different from the type of the bill recognized first after the start/stop button 122 has been pressed will be rejected. In the bottom portion, there are provided a damage level setting switch 129A for setting the damage or fitness level of bills which should be rejected, and a tape length setting switch 129B for setting the length of a tape attached to a bill.

Figure 8:
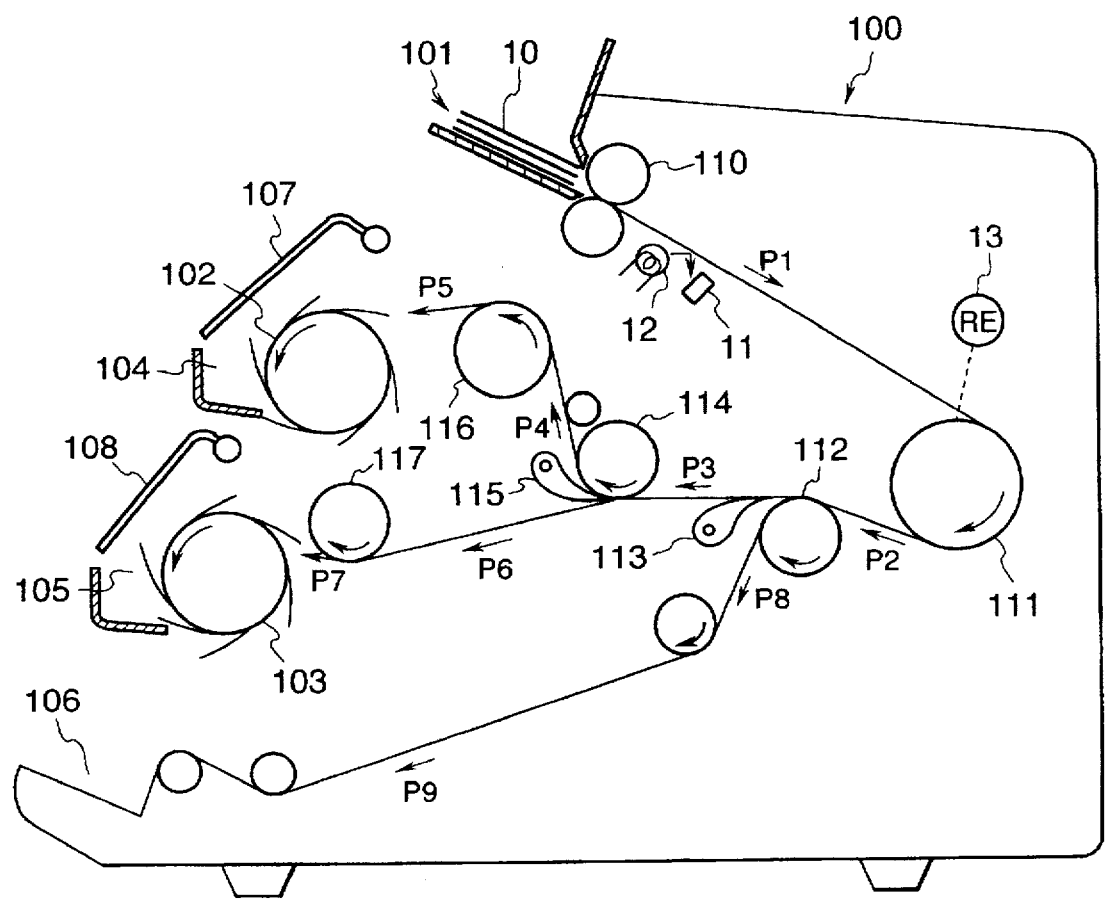
FIG. 8 is a schematic diagram illustrating the internal structure of the neuro-bill recognition apparatus using random masks according to the present invention.
Figure 9:
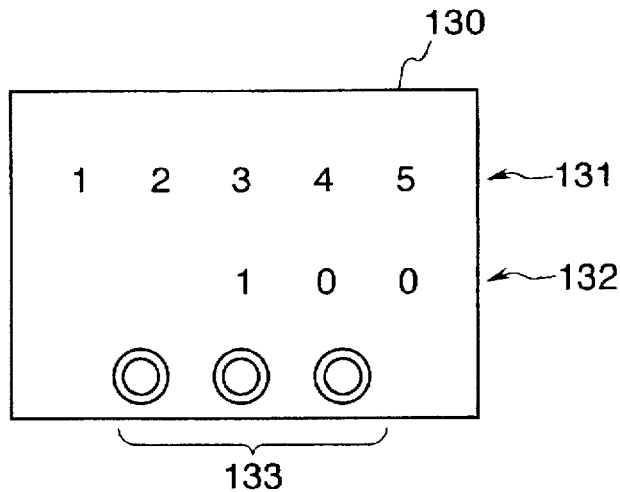
FIG. 9 is a schematic diagram illustrating the detail of a display used in the neuro-bill recognition apparatus using random masks according to the present invention.
Figure 10A:
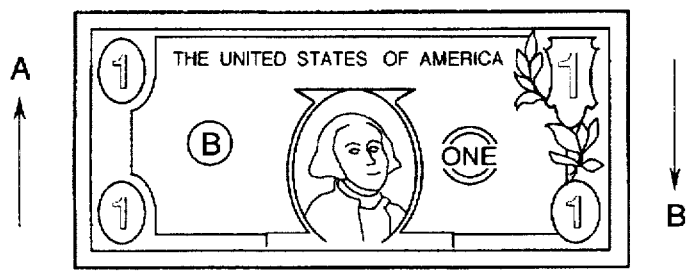
FIGS. 10A and 10B are schematic diagrams illustrating bill data and reading directions.
Figure 10B:
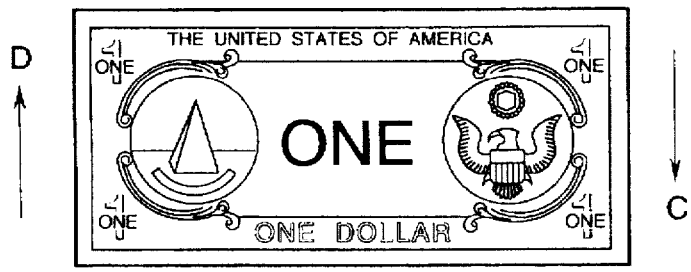

FIG. 8 illustrates an internal structure of the bill-recognition apparatus 100. The bills 10 placed in the hopper 101 are fed in one by one by feeding rollers 110. The bills 10 are transferred via a transfer path P1 to a roller 111, which alters the bill transfer direction so that the bills 10 are transferred via a transfer path P2 toward a roller 112. Near the outlet of the roller 112, there is provided a path switching mechanism 113 for switching the transfer path between a transfer path P3 and a transfer path P8. The bills transferred via the transfer path P8 are further transferred via a transfer path P9 and then stored in the reject stacker 106. The bills sent to the transfer path P3 by the path switching mechanism 113 are further sent to a roller 114, and then sent to a transfer path P4 or P6 designated by a path switching mechanism 115. The bills transferred via the transfer path P4 are sent to a transfer path P5 via a roller 116, and then stored in the first stacker 104 via blades disposed around the bill feeder 102. The bills transferred via the transfer path P6 are sent to a transfer path P7 via a roller 117, and then stored in the second stacker 105 via blades disposed around the bill feeder 103. The bills stored in the first stacker 104 can be taken out to the outside via the opened guide plate 107. Similarly, the bills stored in the second stacker 105 can be taken out to the outside via the opened guide plate 108. In the middle of the transfer path P1, there is provided a line sensor 11 having a light emitting element 12 installed in an integral fashion, for reading the optical pattern image of a bill being transferred on via transfer path P1. A rotary encoder 13 is connected to transfer and feeding means such as the roller 111. The rotary encoder 13 outputs a sampling pulse SP for controlling the timing at which the output data of the line sensor 11 is read in. There are also disposed sensors (not shown) in the middle of each transfer path P1 through P9 for detecting the passage of a bill. The first stacker 104, the second stacker 105, and the reject stacker 106 each have a sensor for detecting a bill being stored or taken out. In the present invention, there are no limitations in the manner in which the bills 10 are placed in the hopper 101. That is, bills may be placed upside down, upside up, or in any directions. These fashions in which the bills 10 are placed are defined by four directions A through D shown in FIGS. 10A and 10B. In the present invention, it is possible to recognize a bill placed in any direction A through D.

Figure 11:
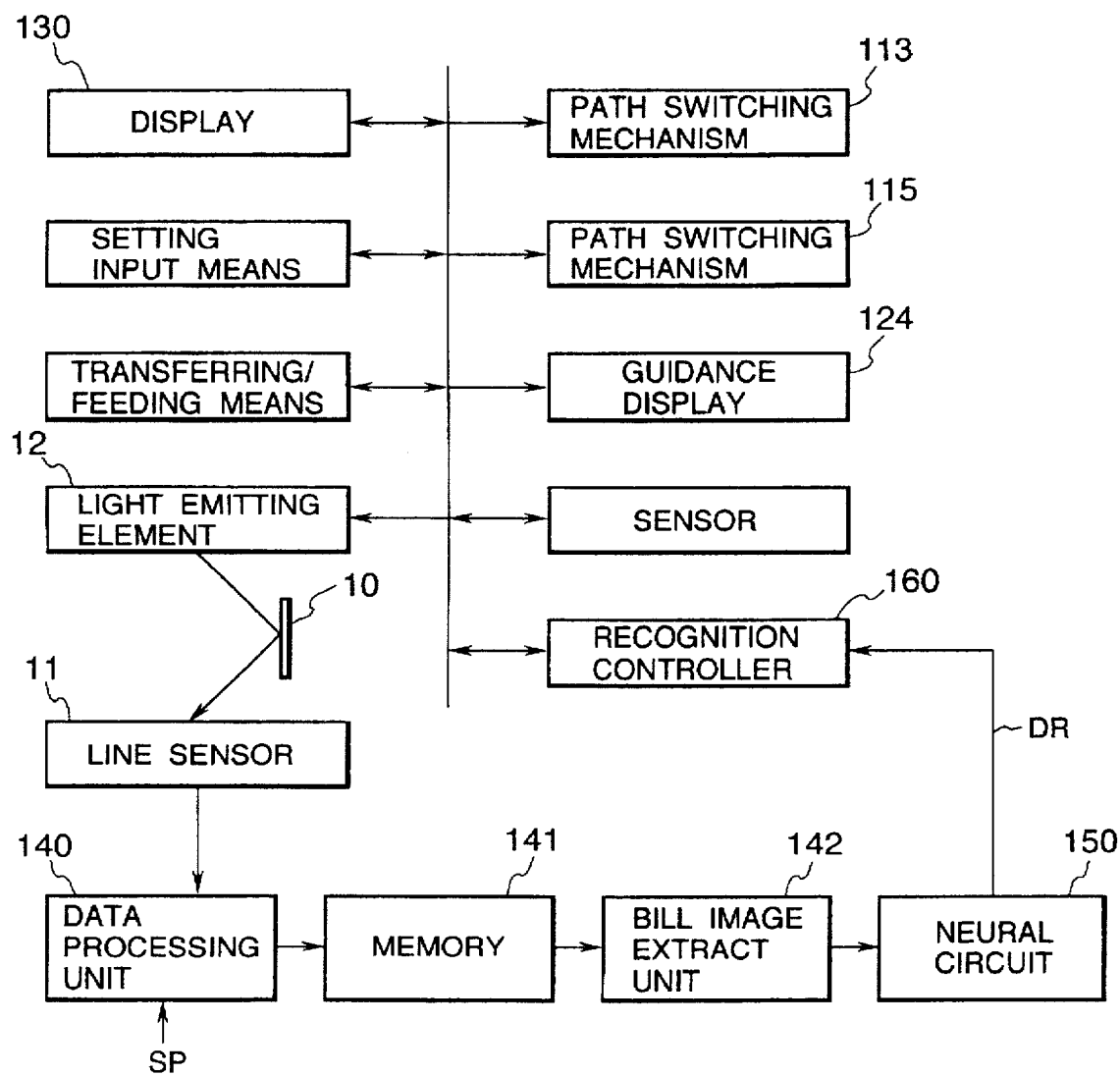
FIG. 11 is a block diagram illustrating the internal configuration of the neuro-bill recognition apparatus using random masks according to the present invention.

FIG. 11 is a block diagram illustrating the internal configuration of the bill-recognition apparatus 100. Light emitted by the light emitting element 12 is reflected from the surface of a bill on the transfer path P1, and inputted to the line sensor 11. The signal read by the line sensor 11 is sequentially inputted to a data processing unit 140, and processed in response to the sampling pulse SP. The processed signal is stored in a memory 141 as a frame image as represented by 141A of FIG. 12. From the data stored in the memory 141, bill image extract unit 142 cuts out only the bill image portion as represented by 142A of FIG. 12. The image extracted in this way is inputted to a neural circuit 150. The recognition result DR provided by the neural circuit 150 is inputted to a recognition controller 160 including a CPU, ROM and RAM. The recognition controller 160 controls the illumination intensity of the light emitting element 12, and also controls the path switching mechanisms 113 and 115. The display 130 and the guidance display 124 are also controlled by the recognition controller 160. The setting input means such as start/stop button 122 are connected to the recognition controller 160 so that the transferring/feeding means such as the feeding roller 110 are driven under the control of the recognition controller 160. The detection signals detected by various sensors are also inputted to the recognition controller 160.

Figure 12:
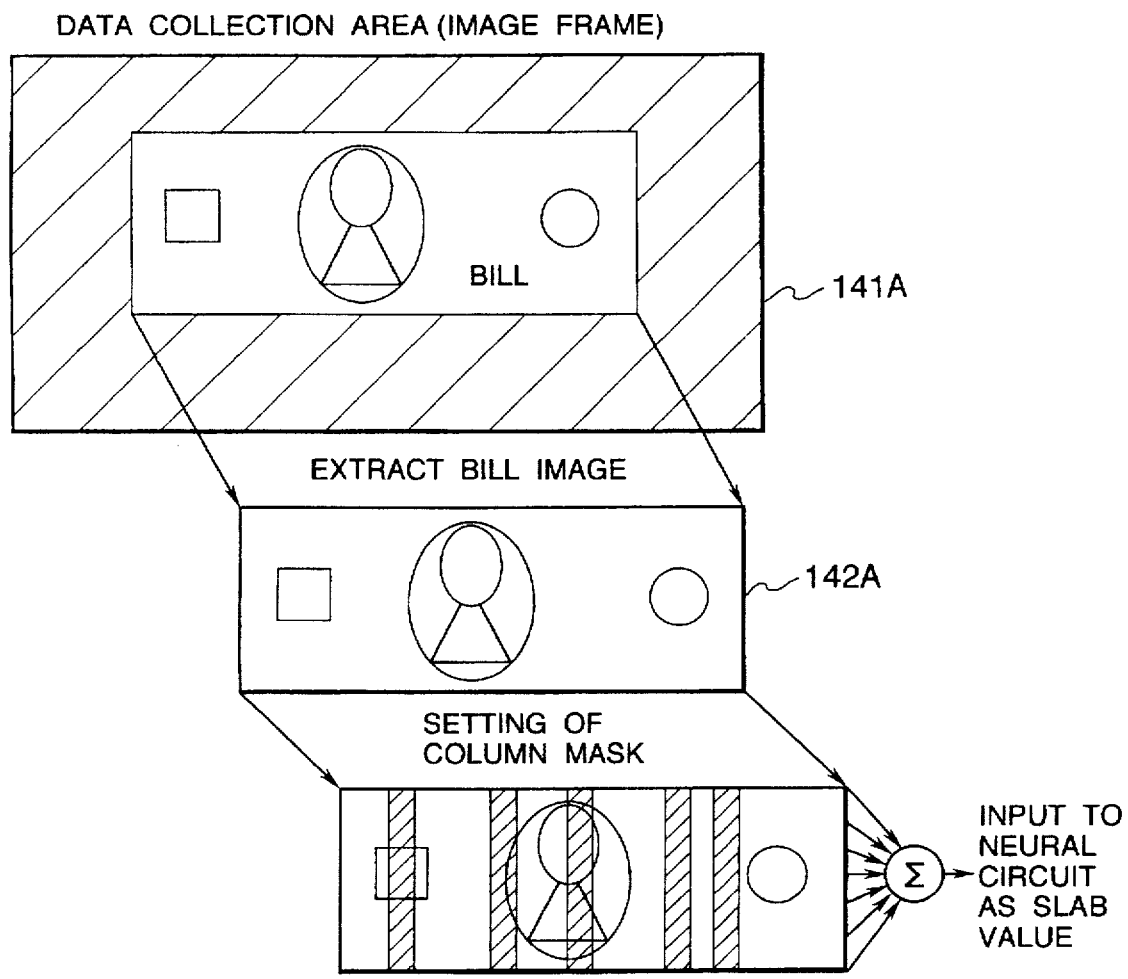
FIG. 12 is a schematic diagram illustrating bill data and reading directions.
Figure 13:
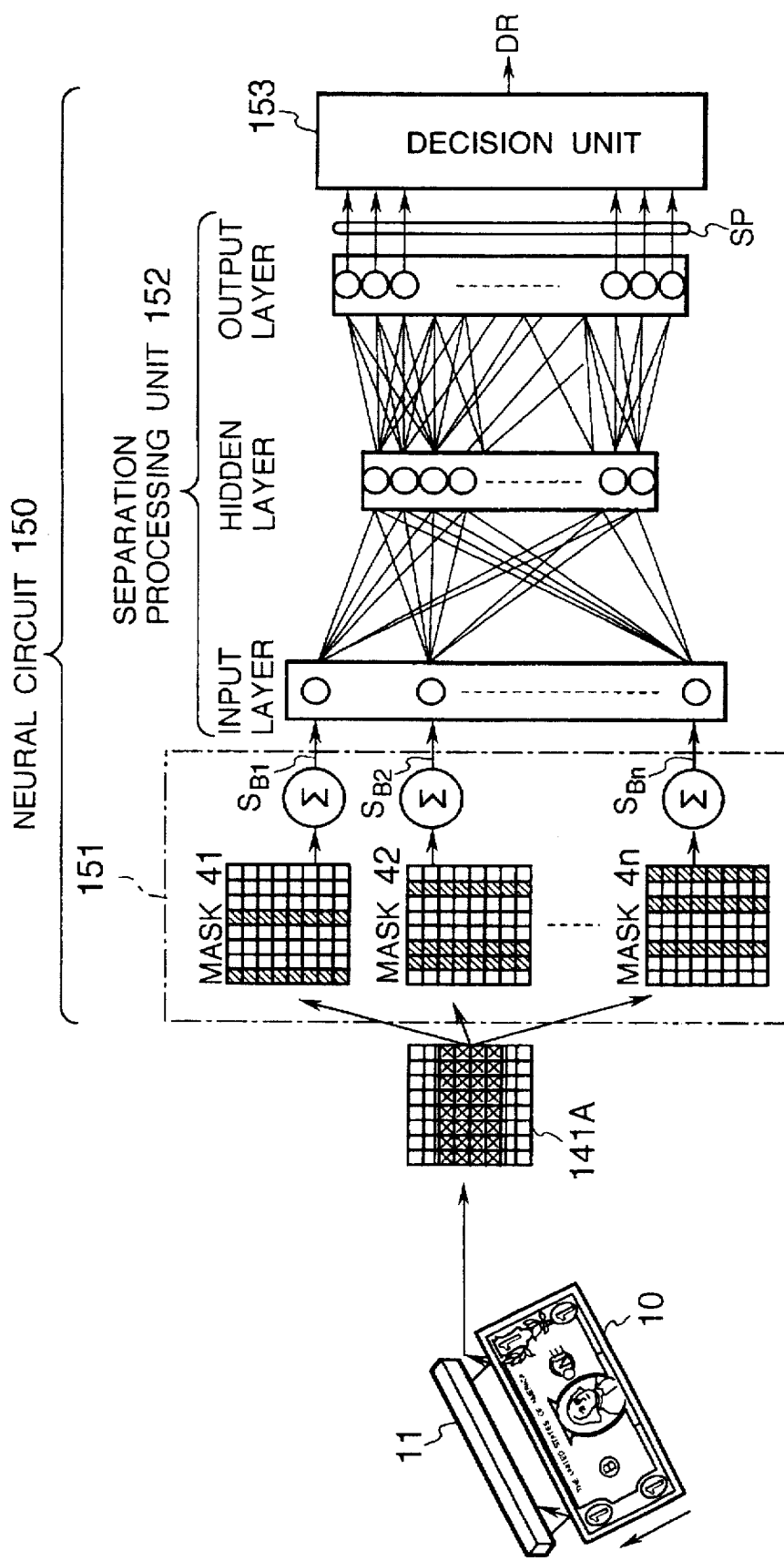
FIG. 13 is a block diagram illustrating the configuration of main portions of the neuro-bill recognition apparatus using random masks according to the present invention.

FIG. 13 is a block diagram illustrating an example of a configuration of the neural circuit 150 in detail. A bill 10 to be recognized is detected by the image sensor 11 comprising a CCD or the like. The detected image is subjected to a proper image processing, thereby obtaining a frame image 141A in the memory 141. From the frame image 141A, the bill image extract unit 142 cuts out only the bill image portion, whereby the bill image is specified as represented by 142A as shown in FIG. 12. In the pre-processing unit 151, then, the image n masks 41–4n are applied to the bill image data 142A so that the sums (slab values) of non-masked pixel data are obtained as slab values SB1 through SBn. These slab values SB1–SBn are inputted to the separation processing unit 152 in the neural network. The separation processing unit 152 calculates separation values SP using weights which have been optimized to recognize respective reference bill patterns. The separation values SP are inputted to a decision unit 153. The decision unit 6 detects a maximum value of the separation values SP, and outputs a pattern corresponding to the maximum value as a pattern image of the object or the bill 10. The masks 41–4n in the pre-processing unit 151 are strip-shaped masks each having a plurality of rectangular segments, wherein some of these strip-shaped segments arranged in the horizontal or vertical direction are designated by random numbers to be closed.

The column masks 41–4n in the pre-processing unit 151 are each formed in a band shape whose longer sides are parallel to the transfer direction, wherein each column mask covers different segments according to the selection based on random numbers. These column masks 41–4n are optimized according to a genetic algorithm which will be described later.

The pre-processing unit 151 having the column masks will be described further. In the present invention, the column masks 41–4n are employed for the following reasons. In a binary image consisting of "0"s and "1"s arranged in an 8×8 matrix as shown in FIGS. 14A and 14B, if a slab value or the sum of all pixel values (the total number of "1"s of the binary image) is used as a characteristic parameter of the image, "14" is obtained as the slab value characterizing a character "E" in FIG. 14A. Similarly, in FIG. 14B, "12" is obtained as the slab value characterizing a character "H". In this way, it is possible to separate "E" from "H" by the slab values. However, in some cases, images having different patterns can have the same slab value. For example, a character "F" shown in FIG. 15A has the slab value of "10", while a character "K" shown in FIG. 15B also has the slab value of "10". Therefore, it is impossible to separate "F" from "K". This problem can be solved by introducing the column masks wherein specific stripe-shaped areas corresponding to specific pixels of an input image are covered with the column masks as shown in FIG. 16C. If the image of FIG. 15A is covered with the masks shown in FIG. 16C, then a resultant image becomes such as that shown in FIG. 16A, and thus the corresponding slab value becomes "8". Similarly, if the image of FIG. 15B is covered with the masks shown in FIG. 16C, then a resultant image becomes such as that shown in FIG. 16B. In this case, the corresponding slab value becomes "9". As can be seen from the above, the introduction of the column masks allow separation between "F" and "K". In view of the above, the locations of a plurality of rectangular areas of masks to be closed are properly selected in a manner for example such as shown in FIG. 16C so that various kinds of images can be separated from each other. The probability that only one set of masks of this kind can generate the slab values which allow separation of various kinds of images is very small. However, if various sets of masks are used, it is possible to give different slab values for the same image as described above. In most cases, there are differences in some slab values of the series of slab values between images. Therefore, it is possible to improve the ability of separating the images from each other by using various sets of the column masks. In terms of physics, a use of different plural sets of the column masks has the following meaning. If a three-dimensional object is observed from various different viewpoints, it is possible to obtain different information on the same object depending on the viewpoint. The use of various sets of the column masks means that an image is observed from various different viewpoints in a two-dimensional plane. Thus, as described above, it becomes possible that the same image can generate different various information.

In this case, an input image is covered with various kinds of the column masks in a pre-processing, and the sum of pixels which are not masked with the column masks give slab values SB1–SBn corresponding to the respective sets of masks, wherein these slab values SB1–SBn have one-to-one correspondence to neurons of the input layer. The unit values of the output layer correspond to decision patterns.

Figure 17:
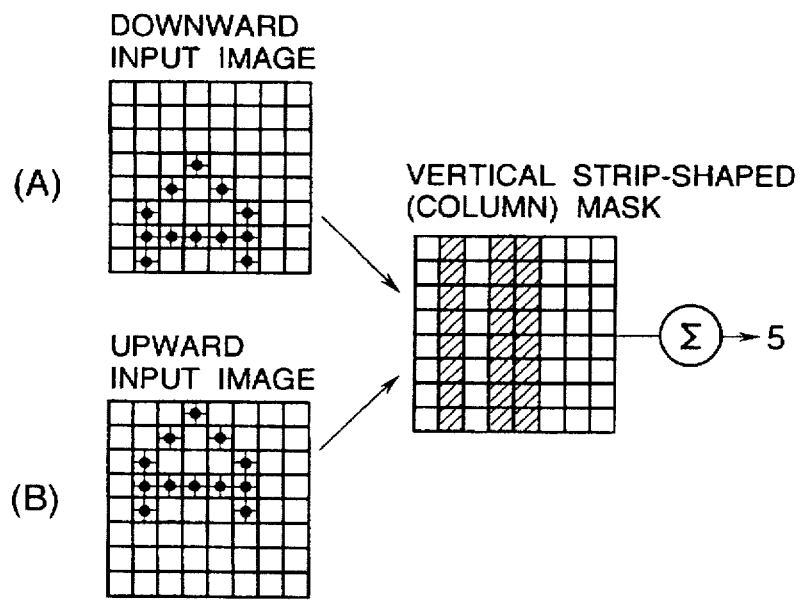
FIG. 17 is a schematic diagram illustrating a vertical column mask.

FIG. 17 illustrates the function of a column mask such as masks 41–4n arranged in the vertical direction. This mask set can provide the same slab value of 5 for both cases where an input image is displaced downward as shown as (A) in FIG. 17 and where an input image is displaced upward as shown as (B) in FIG. 17. In this process, a bill is transferred in the direction parallel to shorter sides of the bill. In transferring, it is very rare that the bill is transferred maintaining just a right angle to the transfer path. In most cases, the right or left side is transferred in a considerable amount of advance of the other sides, which is called slant transferring. When the bill is transferred in a slant fashion, since longer sides of each column mask are shorter compared to row masks (stripe-shaped masks whose longer sides are arranged in the horizontal direction), the slant transferring caused a change of only a small number of pixels. This means that the slant transferring does not have a great influence on the result. In this embodiment, time apparatus is adapted to accept slant angles less than ±8°.

Figure 18:
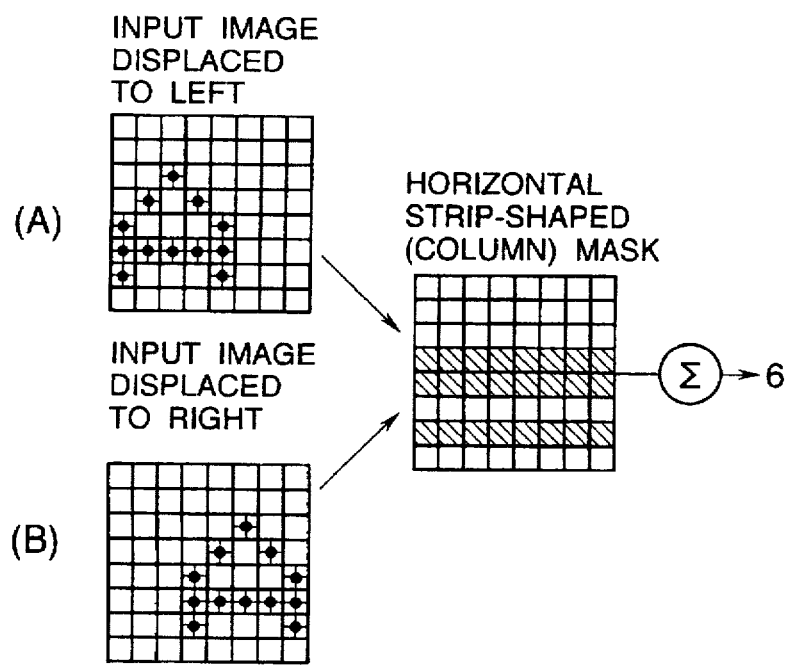
FIG. 18 is a schematic diagram illustrating a strip-shaped mask arranged in the horizontal direction.

FIG. 18 illustrates the function of a strip-shaped mask arranged in the horizontal direction, wherein the mask can provide the same slab value of 6 for both cases where an input image is displaced to the left as shown in FIG. 18(A) and where an input image is displaced to the right as shown in FIG. 18(B). Thus, a constant slab value can be obtained regardless of displacement in location of the input image.

Figure 19:
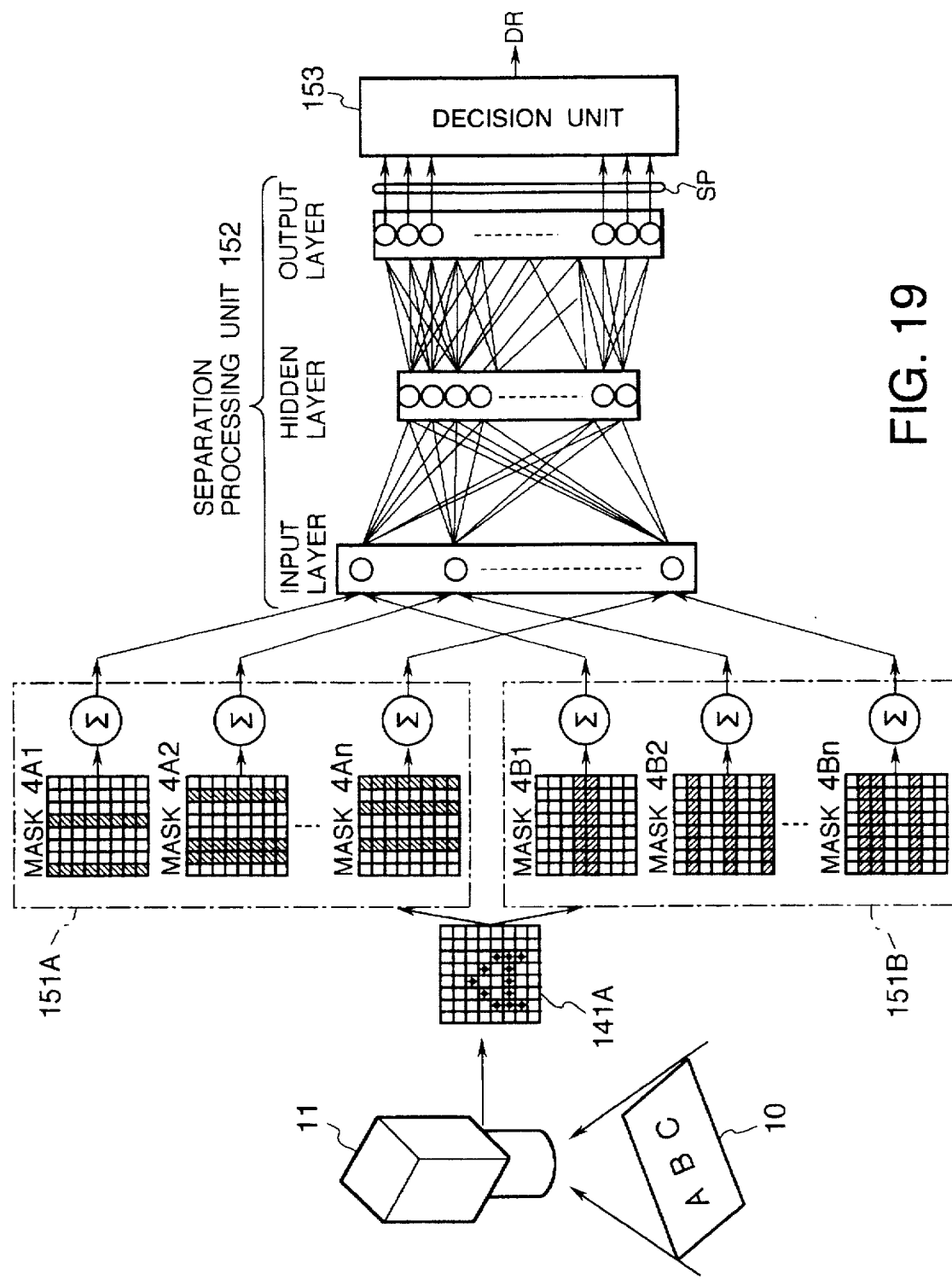
FIG. 19 is a block diagram illustration another embodiment of a pattern recognition apparatus according to the present invention.

FIG. 19 illustrates an example of a currency recognition apparatus having a pre-processing unit 151A including strip-shaped masks 4A1–4An arranged in the vertical direction, and also having a pre-processing unit 151B including strip-shaped masks 4B1–4Bn arranged in the horizontal direction.

Now, how to determine a proper number of and a proper arrangement of the column masks will be discussed, wherein these factors have to be determined prior to an actual recognition processing.

In the pre-processing unit 151, the types of the column masks 41–4n and the closed areas in each mask 41–4n are parameters which should be taken into consideration. The learning of the neural network is performed according to an algorithm based on the back-propagation method.

$$\Delta W(t)_{i,j}^{k-1,k} = -\epsilon d_j^{k\,k-1} o_i^{k-1,k} + \alpha \Delta W(t-1)_{i,j}^{k-1,k} + \beta \Delta W(t-2)_{i,j}^{k-1,k} \quad (1)$$

where, $\Delta W$: correction amount of weight d: generalized error o: output t: sample number $\epsilon$: positive learning constant $\alpha$: proportional constant of inertia clause $\beta$: proportional constant of oscillation clause i,j: index factor of unit k: index factor of layer Weights are at modified each time when a pattern is presented. Decision of convergence is done by watching the sum of the square of a difference between each output value of the output layer and each supervising value for each pattern. If the sum reaches a value equal to or less than a predetermined allowable minimum error, or if the number of presentations reaches the maximum number, it is considered that the convergence has been achieved. Here, the number of the presentations is defined as that when the supervising values have been presented to all seven U.S. bill-patterns from $1 to $100, the number of the presentations is counted as one time. Learning data associated with seven U.S. bill-patterns from $1 to $100 are sequentially presented to the neural network. The recognition ability is evaluated using the correct recognition ratio ES which can be written as:

$$ES = \text{(the number of events of correct recognition)} / \quad (2)$$
$$\text{(the total number of events)} \times 100$$

Figure 20:
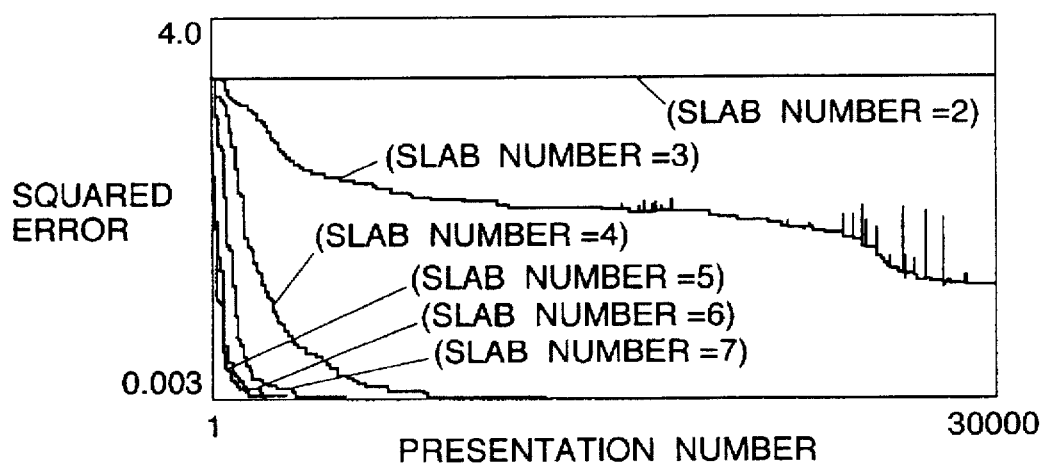
FIG. 20 is a schematic diagram illustrating the achieved level of learning for various slab numbers.

Now, the learning status and the acquired recognition ability will be discussed for various kinds of masks, that is, for various numbers of slab values. First, the masks for use in the present invention are produced as follows. Corresponding to the number of columns or rows of the matrix in which an input image is arranged, "8" random numbers in the range of [−1, 1] are generated. Column areas corresponding to the resultant negative random values are closed. Similarly, the random values are generated starting from various initial values, thereby producing various kinds of the column masks. Here, evaluation will be done for six different slab numbers "2", "3", "4", "5", "6" and "7". FIG. 20 illustrates the achieved level of the learning of the neural network as a function of the presentation number up to 30,000 for six different slab numbers. The horizontal axis represents how many times the supervising data has been presented, and the vertical axis represents the squared error. Apparently, as can be seen from FIG. 20, the learning is not converged when the slab number is "2", which means that pattern separation is impossible. When the slab number is "3", the learning of the neural network shows a certain tendency of convergence, however the error curve shows oscillations. The learning has been further continued until 60,000 times. However, the squared error did not become less than 1.0. When the slab number is equal to or greater than "4", a good convergence in the learning has been observed as shown in FIG. 20.

From the above discussion, it can be concluded that four or greater is enough as the slab number applied to the input layer of the separation processing unit 152. This means that this technique requires an extremely smaller number of neurons and thus extremely simpler separation processing unit 152 compared to the conventional technique in which data of 64 (=8×8) pixels are inputted to the input layer.

Figure 21:
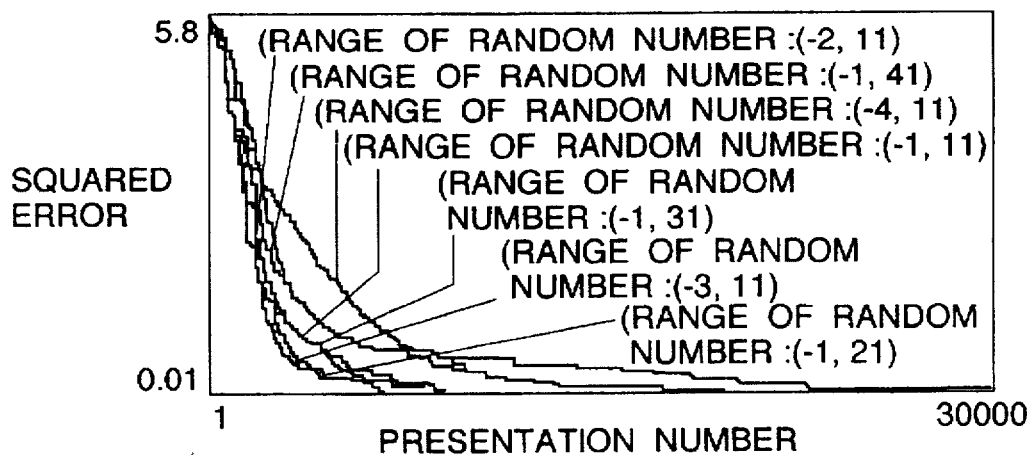
FIG. 21 is a schematic diagram illustrating the achieved level of learning for various masked areas of a mask.

Now, the learning status and the recognition ability will be described in connection with closed areas of the column masks. Arrangement of closed mask areas is determined according to the variation ranges of random numbers. That is, the range of [−1, 1] is employed as a reference range, and the covering areas are increased for the random numbers in the range of [−2, 1], [−3, 1] and [−4, 1], and decreased for the random numbers in the range of [−1, 1], [−1, 3] and [−1, 4]. Here, the slab number is assumed to be "4". FIG. 21 illustrates the learning status as a function of the presentation number up to 30,000, for various ranges of the random numbers. In this figure, horizontal and vertical axes are defined in the same manner as in FIG. 20. From FIG. 21, it can be seen that the learning has only little dependence on the manner of closing mask areas. The recognition ability also has little dependence on the manner of closing mask areas. Therefore, it is not necessary to take the manner of the closing areas of each mask into much consideration, but it is possible to rather randomly select closed areas taking the kinds of masks into consideration.

Figure 22:
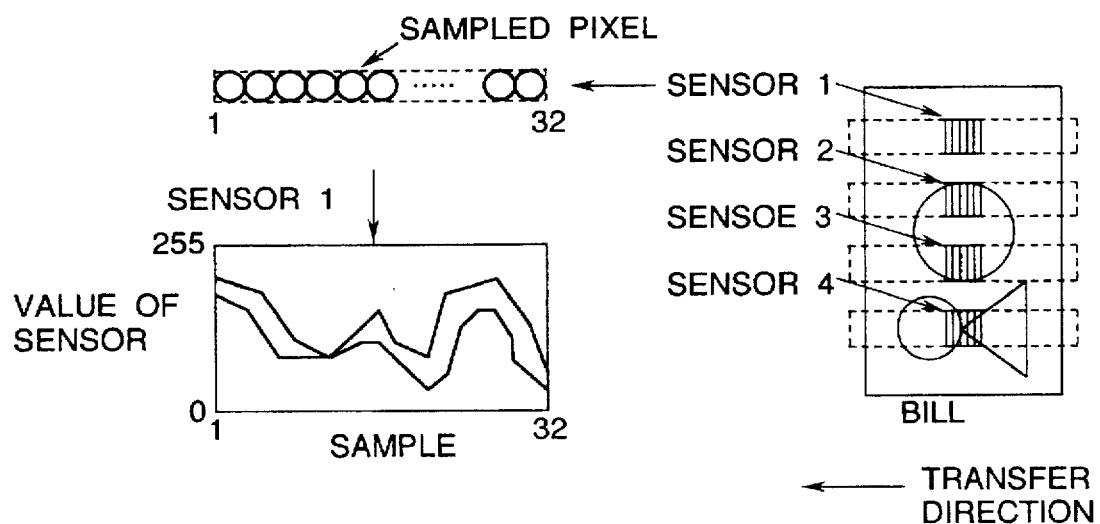
FIG. 22 is a schematic diagram illustrating an example of the present invention where halftone patterns are recognized.

The above-described technique of reducing the slab number using the column masks can also be applied to the case where halftone patterns are recognized. It will be shown below that the present invention can be advantageously applied to recognition of bill data consisting of a 255-step halftone image. In this example, time bill data is read sequentially by sensors arranged in such a manner as shown in FIG. 22 wherein the arrangement of the sensors are determined experimentally so that the sensor can extract characteristic features of a bill. In FIG. 22, rectangles represented by broken lines are such areas which are scanned by respective sensors during transferring of the bill. Here, two techniques of inputting data will be discussed. The first technique is to directly input time series data associated with a bill (hereafter, referred to simply as "time series data") to the apparatus according to the present invention. In the second technique, Fourier transformation is first performed on each time series data obtained by each sensor. Then, resultant power spectrum (Fourier power spectrum) is inputted in the apparatus according to the present invention.

$$A(n) = 1/N \cdot \sum_{k=1}^{N} f(k) \cos\left( \frac{2\pi}{N} (k-1)n \right) \quad (3A)$$

$$(n = 0, 1, 2 \ldots, N/2 - 1, N/2)$$

$$B(n) = 1/N \cdot \sum_{k=1}^{N} f(k) \sin\left( \frac{2\pi}{N} (k-1)n \right) \quad (3B)$$

$$(n = 1, 2 \ldots, N/2 - 2, N/2 - 1)$$

where; f(k): bill data, N: number of data, A(n), B(n): Fourier coefficient,

Fourier transformation of f(k) is expressed as F(n), or F(n)=A(n)+jB(n).

Figure 23:
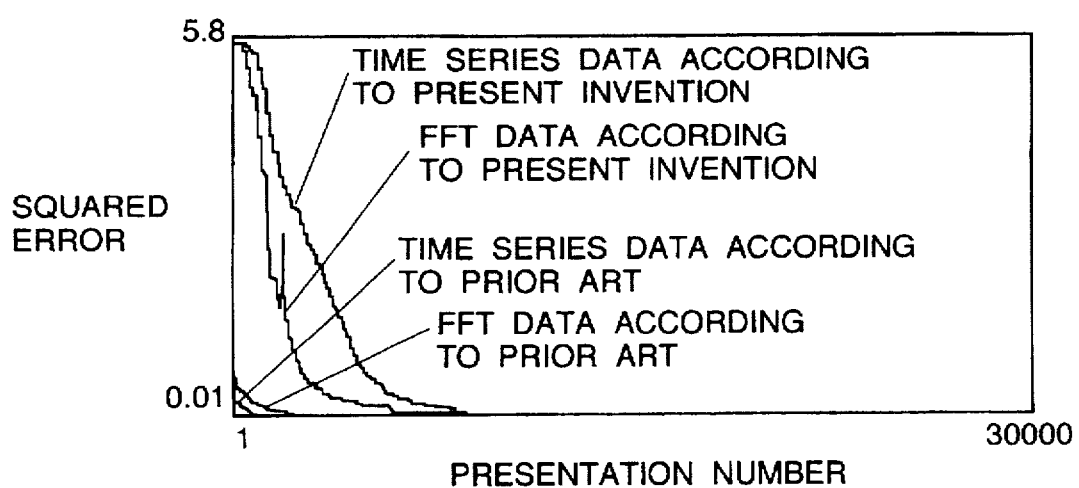
FIG. 23 is a schematic diagram illustrating the achieved level of learning of the neural network for both cases where time series data associated with a bill is directly inputted and where its Fourier power spectrum data is inputted, and also for both cases where the present invention is used and where a conventional technique is used.

The Fourier power spectrum of time series data is used for the following reasons. In the bill-recognition apparatus, 8 or greater number of bills are recognized each second, and thus the bill is transferred at a speed of 600 mm/sec or greater. The data inputted into the recognition apparatus contains errors due to various reasons occurring during the transfer of the bill. In particular, displacements in location of sample cause a great error. The error can be eliminated by using the Fourier power spectra associated with the time series data thereby improving the recognition ability. In this example of the present invention, the slab number is assumed to be 16 for both cases where the time series data is directly inputted and where its Fourier power spectra is inputted. Therefore, the number of units of the input layer of the neural network should be 16. Furthermore, the hidden layer is assumed to also have 16 units. The unit values of the output layer correspond to decision patterns, wherein the number of the units is assumed to be 12 in this example. This is determined so that the apparatus of this example can recognize three kinds of bills including Japanese 10,000-yen, 5,000-yen and 1,000-yen bills for four transfer directions associated with a normal primary face, inverted primary face, normal back face, and inverted back face, wherein it is assumed that no counterfeit bills are included. The optimum slab number is determined experimentally taking into account the convergence of the learning and the required number of units, for both cases where the time series data is directly inputted and where its Fourier power spectrum is inputted. FIG. 23 illustrates the results of bill-recognition performed under the above-described conditions. In this figure, "FFT data" denotes a Fourier power spectrum.

As can be seen from FIG. 23, it is apparent that the learning can be done successfully and the squared error is converged to a value less than 0.01 in both cases where the time series data is directly inputted and where its Fourier power spectrum is inputted. In FIG. 23, the horizontal axis represents the number of presentations of supervising data, and the vertical axis represents the squared error. For evaluation, the bill data of 10 bills for each of 12 different patterns including three kinds of the bills with respect to four directions for each kind of the bill, which have not been learned yet, were recognized using the weights which had been determined via the above-described learning. The resulting correct recognition ratio ES was 100% for all cases.

Therefore, a reliable recognition of the bills is possible using the sixteen types of masks, and thus sixteen or greater is enough as the slab number applied to the input layer of the separation processing unit 152. Specific column masks have been evaluated by simulation. Taking into account that one pixel has a width of 1 mm and a length of 4 mm, the width of a column mask is increased from 1 mm to 10 mm in steps of 1 mm, and random combinations of the such column masks are evaluated by means of the simulation to determine the column width and the locations which can give the highest efficiency. In this embodiment, the sixteen column masks having dimensions of 6 mm (horizontal)×66 mm (vertical) are employed to obtain the best result. FIG. 24 illustrates an example of mask information of a column mask, wherein it is assumed that a bill is divided into 16 segments into the lateral direction, and numerals 1, 2 . . . , 9, 0, . . . , 5, 6 designate the mask locations corresponding to these 16 segments. In FIG. 24, "0" represents that a segment is not masked, and "1" represents that a segment is masked. In unit No. 1, a slab value obtained through a mask which does not cover any segments is inputted. In unit Nos. 2–16, the slab values obtained through masks each cover segments at random locations are inputted.

Figure 1:
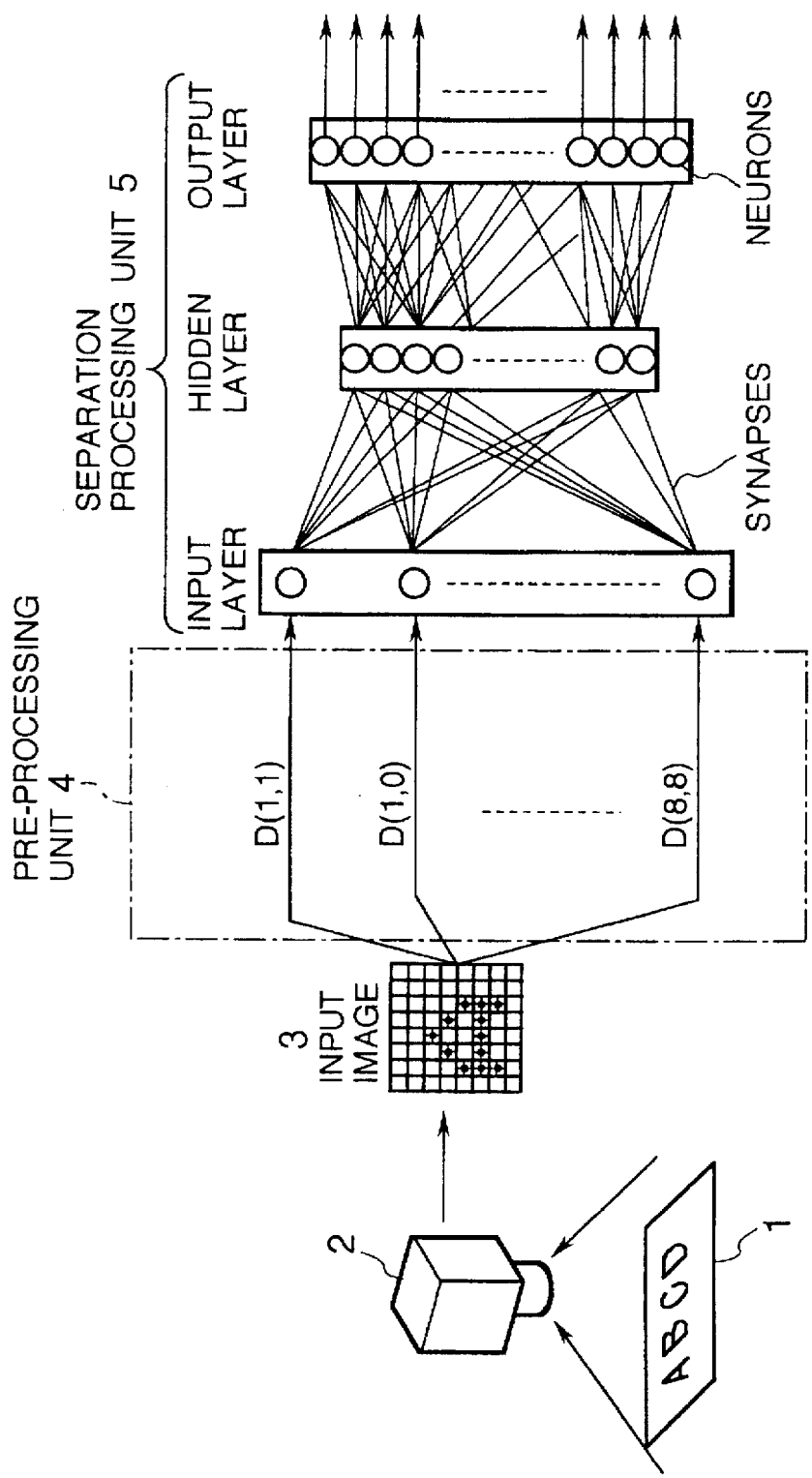
FIG. 1 is a block diagram illustrating an example of a configuration of an ordinary neuro-bill pattern discrimination apparatus.
Figure 2A:
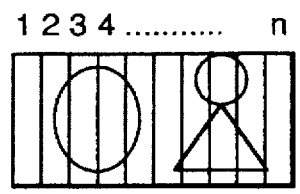
FIGS. 2A and 2B are schematic diagrams illustrating problems in the optimization of masks according to a conventional technique.
Figure 2B:
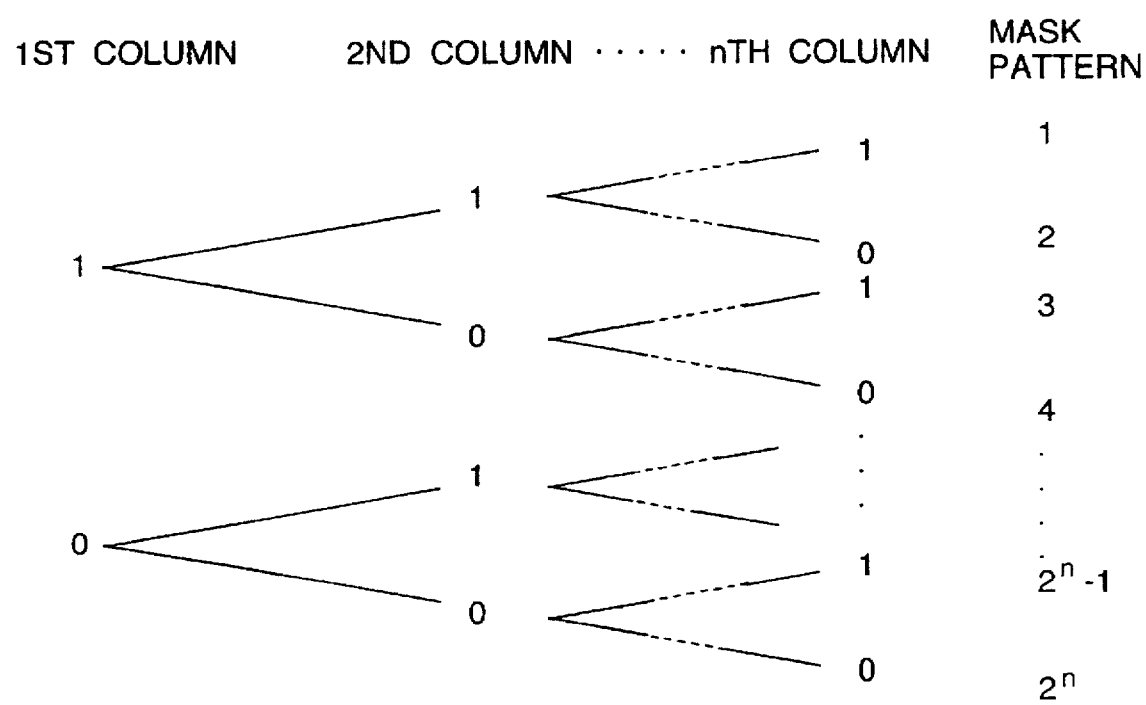

Unlike the conventional technique shown in FIG. 1 in which data of 6, 480 (=216×80) pixels are inputted to the input layer, directly this embodiment according to the present invention needs an extremely smaller number of neurons and thus an extremely simpler separation processing unit.

In the present invention, furthermore, the slab number is not limited only to "16". A slab number slightly less than "16" may also be employed to obtain good enough recognition, while the learning speed increases. If the slab number is increased, it becomes possible to accomplish more reliable recognition. Furthermore, the present invention is not limited to the recognition of Japanese 10,000-yen, 5,000-yen, and 1,000-yen bills×4 transfer directions, but applicable to recognition of additional foreign bills. In this case, the slab number may be readily increased as required.

Figure 25:
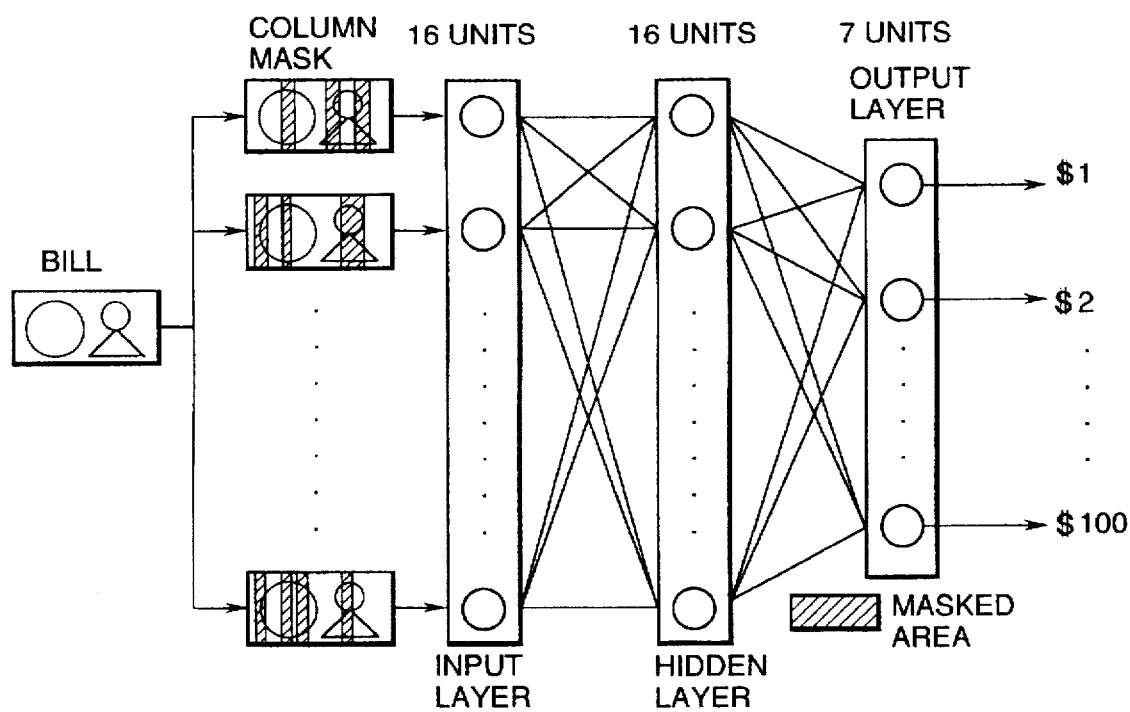
FIG. 25 is a block diagram illustrating the detailed configuration of main portions of the neuro-bill recognition apparatus using random masks according to the present invention.

Now, the separation processing unit 152 will be described further. The separation processing unit 152 receives information which has been pre-processed by the pre-processing unit 151, and performs the separation processing. The separation processing unit 152 has a hierarchical structure including an input layer, a hidden layer and an output layer. As shown in FIG. 25, the input layer has neurons which have one-to-one correspondence to respective mask sets of the pre-processing unit 151. Each slab value (the sum of the number of pixels obtained after the masking process has been performed) obtained by performing a pre-process with each type of the mask set is inputted to a corresponding neuron. The hidden layer includes at least one layer of neurons, which performs the separation processing on the information given in the input layer and transmits resulting information to the output layer. If the number of the hidden layers is large enough, then it is always possible to perform the separation into correct patterns regardless of variations in the information given to each neuron of the input layer. The output layer has neurons which have one-to-one correspondence to respective categories to be discriminated. The output layer calculates output unit values for respective output units according to weight factors among neurons established by the learning. The maximum value (about 0.99 for normal bills) of a plurality of output unit values (in the range from 0 to 1) and the next maximum value (which corresponds to second candidate for a type of a bill, and which is less than 0.2) are extracted. Then, whether the maximum value is greater than a threshold value 1 (0.6 in a usual case) is determined. If the maximum value is less than the threshold value 1, it is removed from data to be learned. Furthermore, the difference between the maximum value and the next maximum value is greater than a threshold value 2 (0.4 in a usual case) is determined. If the difference is less than the threshold value 2, the maximum value is dismissed. If the difference is greater than the threshold value 2, a pattern of a unit corresponding to the maximum value is employed as a decision bill-pattern. In this processing, both maximum and next maximum values are checked so as to prevent an error such as that an incorrect type of the bill is mis-discriminated.

For example, in the case where U.S. dollar bills including $1 to $100 are discriminated, the types of the bills from $1 to $100 correspond to respective neurons up to down in the output layer. In discrimination processing, a neuron corresponding to a correct type of the bill outputs a value closest to one, that is, the maximum value, and the other neurons output values close to 0. When a bill to be discriminated is $1, the neuron at the top of the output layer outputs the maximum value, and thus it is determined that $1 is a decision pattern.

Similarly, in the discrimination of the dollar bills, 7 types of $1, $2, $5, $10, $20, . . . , $100×4 directions thus 28 types in total have one-to-one correspondence to 28 neurons arranged up to down in the output layer. The neurons included in the input, hidden and output layers are connected to each other via interconnections called synapses. Each synapse memorizes the strength of connection between the neurons represented by a weighting function. One neuron receives signals via the synapses from a plurality of the neurons in the preceding layer, wherein each input value is obtained by multiplying each signal by a weight factor of the corresponding synapse via which the signal is received. When a neuron has received signals from all neurons to which the neuron is connected, the sum of input values is calculated. If the sum exceeds a predetermined threshold value given to the neuron, the neuron fires and sends output signals to the neurons in the succeeding layer. This process is performed repeatedly whereby information is outputted via the output layer.

The weight of each synapse is determined by the learning according to the back-propagation method as explained formula (1), depending on objects to be recognized.

Now, the decision unit 153 will be described. The decision unit 153 receives the information outputted by the output layer in the separation processing unit 152. The decision unit 153 detects the maximum value of the given information, and decides that the inputted data should come into a category corresponding to the neuron which outputs the maxim value. For example, when a $1-bill read in the A-direction, a $1-bill read in the B-direction, a $1-bill read in the C-direction, etc., correspond to the neurons arranged up to down in the output layer, if the neuron at the top outputs the maximum value, then it will be decided that the bill to be recognized must be "$1-bill read in the A-direction".

Figure 26A:
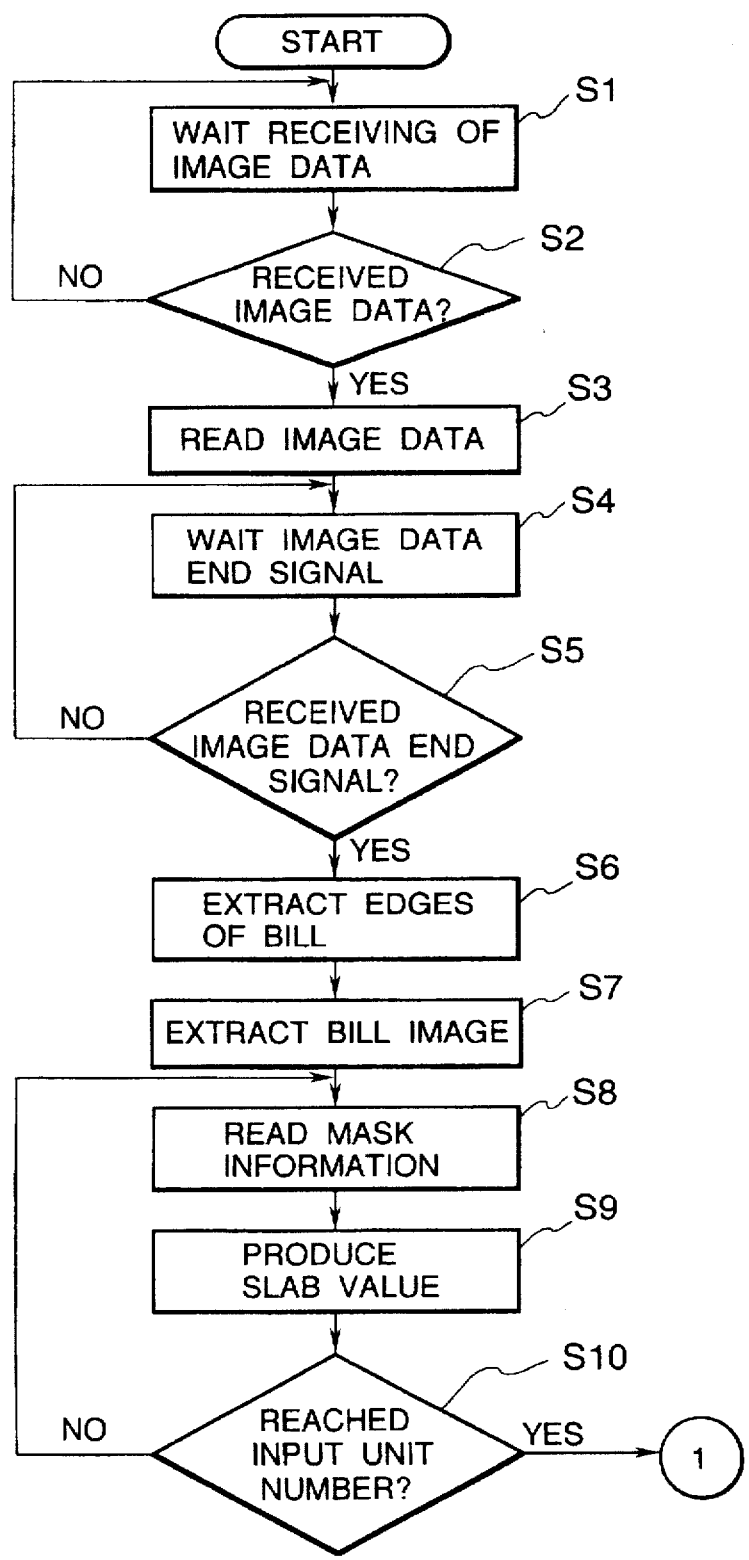
FIGS. 26A and 26B are flow charts illustrating an operation example of the neuro-bill recognition apparatus using random masks according to the present invention.
Figure 26B:
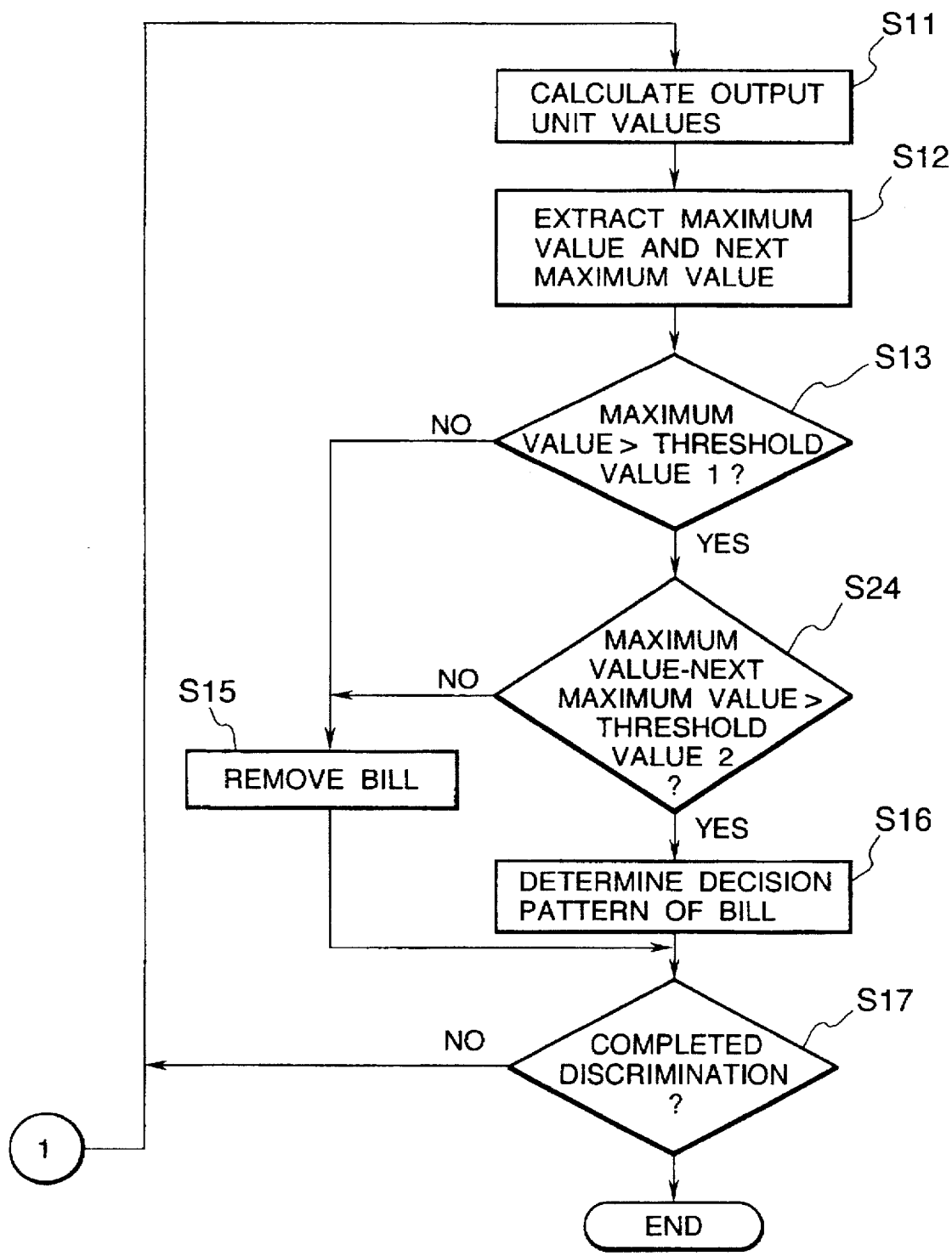

Referring to the flow chart shown in FIGS. 26A and 26B, the operation of the system configured in the above-described manner will be explained. After placing bills 10 in the hopper 101, if the start/stop button 122 is pressed, the recognition controller 160 drives transferring/feeding means so that the feeding roller 110 feeds the bills 10 one by one to the transfer path P1. The bill fed to the transfer path P1 is illuminated with light emitted by the light emitting element 12. The light reflected from the bill is inputted to the line sensor 11 comprising a CCD or the like. The signal read by the line sensor 11 is inputted to the data processing unit 140. The sampling pulse SP outputted by the rotary encoder 13 is also inputted to the data processing unit 140. Scanning is started at each predetermined time of mechanical clocks, and one line pixel data consisting of pixels disposed at intervals of 4 mm in the bill transfer direction and at 1 mm pitch in the lateral direction is subjected to analog-to-digital (A-D) conversion. The converted digital value is written in the memory 141. In this way, the optical image of the bill 10 is inputted in the memory (Steps S1–S5). In this example, the memory 141 has a capacity to store the data of an area of 256 mm×128 mm for one bill, wherein the actual dimensions of a U.S. dollar bill is 156 mm×66 mm. When the image data is subjected to the masking process in the subsequent step, it should be avoided to perform the masking on an area other than the bill area. To accomplish this, the bill image extract unit 142 extracts edges of a bill image disposed in the memory 141 (Step S6), and cuts out the data corresponding to the identified bill area (Step S7). Then, the bill area is subjected to image processing, and thus an input image is obtained.

Since a reflection-type sensor is employed as the optical system, an A-D converted value corresponding to the darkest portion in the area including no medium times a predetermined value is used as a threshold value to determine the existence or absence of a medium, thereby selectively inputting the data corresponding to a bright area. When a transmission-type sensor is used, the area darker than the threshold value defined in the above-described manner corresponds to a bill area.

The image data cut out by the bill image extract unit 142 is inputted to the neural circuit 150. The pre-processing unit 151 in the neural circuit 150 reads mask information (Step S8), and produces a slab value according to the mask information. The Steps S8 and S9 are carried out repeatedly until the number of the slab values has become equal to the number of the input units (Step S10). Then, the separation processing unit 152 calculates output unit values using weights among neurons which have been established via the learning (Step S11). Then, the maximum value (about 0.99 for normal bills) of the output unit values (in the range from 0 to 1) and the next maximum value (which corresponds to a second candidate for a type of a bill, and which is less than 0.2) are extracted (Step S12). Then, whether the maximum value is greater than a threshold value 1 (0.6 in a usual case) is determined (Step S13). If the maximum value is less than the threshold value 1, the data of such a bill is removed from learning (Step S15). Furthermore, the difference between the maximum value and the next maximum value is greater than a threshold value 2 (0.4 in a usual case) is determined (Step S14). If the difference is less than the threshold value 2, the maximum value is dismissed. If the difference is greater than the threshold value 2, a pattern of a unit having the maximum value is determined as a decision pattern of the bill under examination (Step S16). The decision unit 153 receives the information outputted by the output layer in the separation processing unit 152. The decision unit 153 detects the maximum (or minimum) value of the given information, and decides that the inputted data should come into a category corresponding to the neuron which outputs the maximum value. The recognition result DR is inputted to the recognition controller 160. When the above recognition process is being carried out, the bill is transferred to the roller 112 via the transfer paths P1 and P2. Before the bill reaches the roller 112, the recognition controller 160 has driven the path switching mechanisms 113 and 115, depending on the received recognition result DR. If the bill is recognized as a designated bill, the path switching mechanism 113 is driven such that it moves away from the transfer path P3 toward the roller 112, and the path switching mechanism 115 is driven such that it moves toward the transfer path P6. As a result, the bill is transferred via the transfer paths P3, P4 and P5 to the bill feeder 102 which in turn feeds the bill into the first stacker 104. On the other hand, if the bill is recognized as not a designated bill, the path switching mechanism 113 is driven such that it moves away from the transfer path P3 toward the roller 112, and the path switching mechanism 115 is driven such that it moves away from the transfer path P6 toward the roller 114, whereby the bill is transferred via the transfer paths P3, P6 and P7 to the bill feeder 103 which in turn feeds the bill into the second stacker 105. When the value of the bill cannot be recognized, the path switching mechanism 113 is moved toward the transfer path P3 so that the bill is transferred via the transfer paths P8 and P9 into the reject stacker 106. In response to a bill-storing detections signal provided by a sensor, the recognition system controller 160 drives the display 130 such that the number of and the value of stored bills are displayed. If there remain bills to be recognized, the process returns to the Step S11 and the above-described steps are repeated (Step S17).

Figure 27:
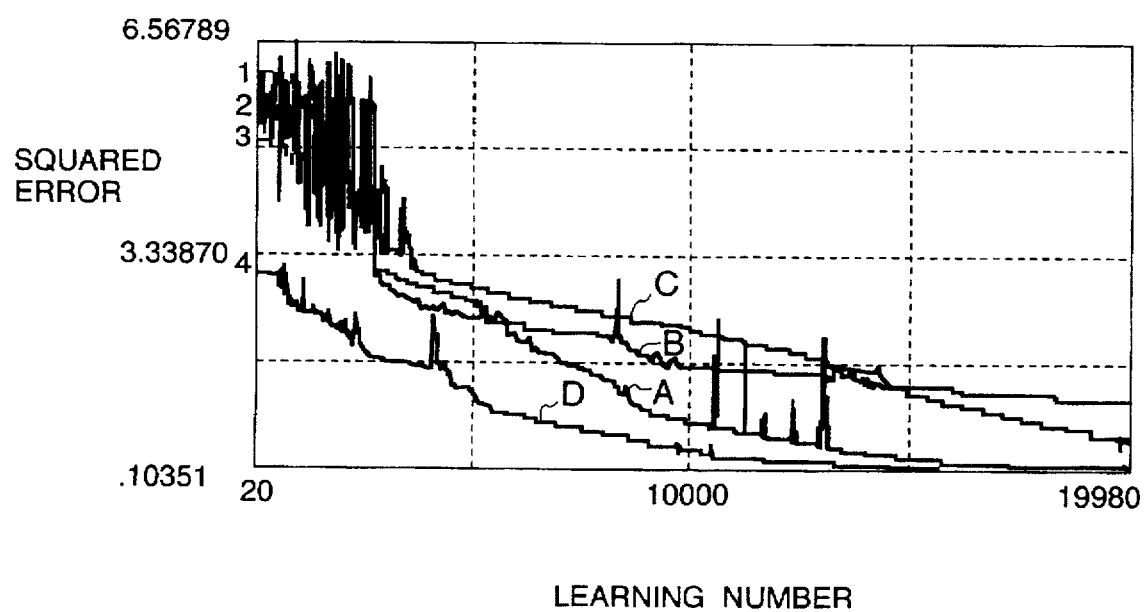
FIG. 27 is a schematic diagram illustrating the acquisition level of learning with respect to bill directions.

FIG. 27 illustrates the learning status of the neural network for seven kinds of U.S. dollar bills with respect to each direction (A, B, C, D). In this figure, the horizontal axis denotes the learning number, and the vertical axis denotes the squared error. As can be seen from FIG. 27, the squared error decreases and converges to a value less than 0.2, as the learning number increases.

In another embodiment described below, neural networks are connected in cascade.

Figure 28:
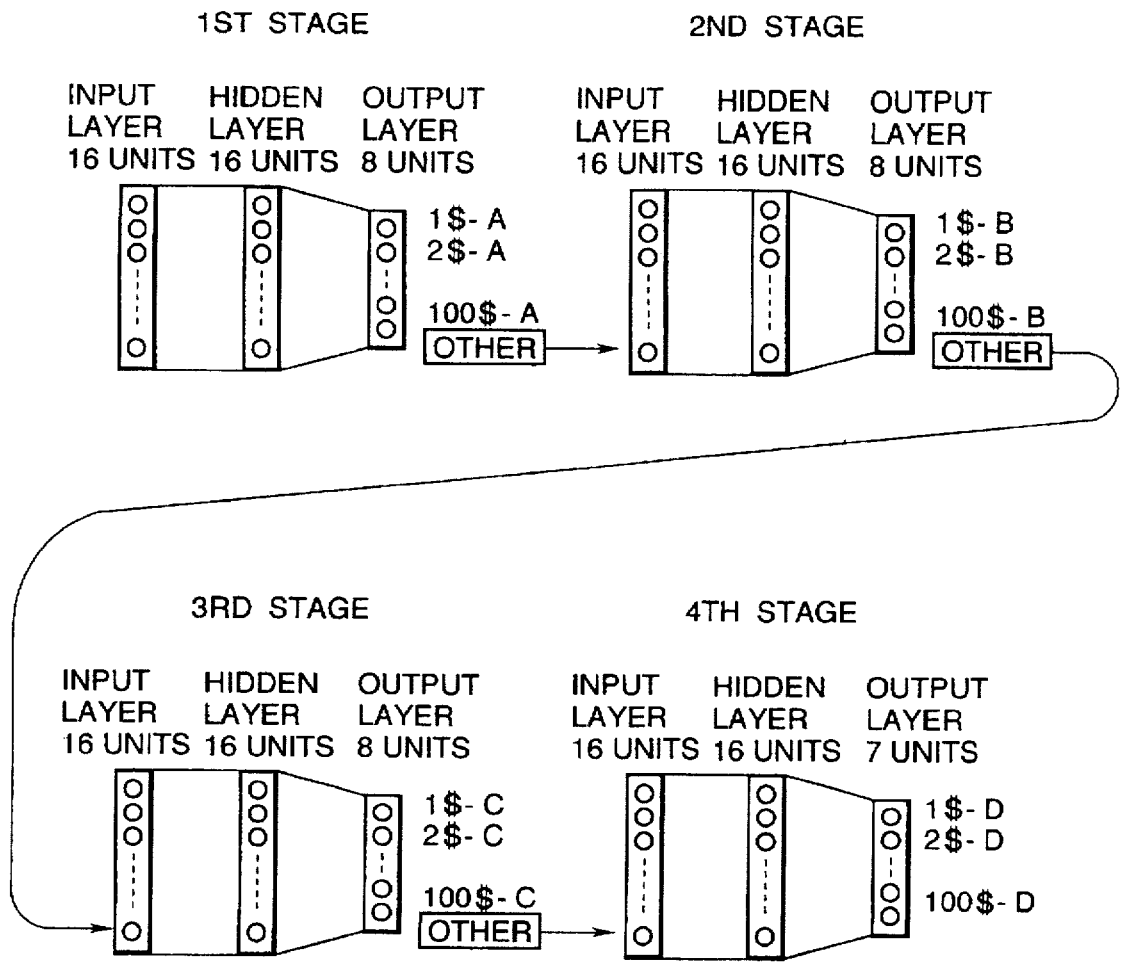
FIG. 28 is a schematic diagram illustrating a neuro-bill recognition apparatus using random masks according to the present invention, wherein neural networks are connected in cascade.

FIG. 28 is a schematic representation of the cascade connection of neural networks. First, at the first stage of the neural network, 16 units in the input layer, 16 units in the hidden layer and 8 units in the output layer are prepared. Seven units of eight units in the output layer are assigned to bills of $1 to $100 scanned in the A-direction (there are four directions A, B, C and D including upside up and forward, upside up and backward, upside down and forward, upside down and backward). The remaining one unit, or the eighth output unit, is assigned to other bills. Thus, the first stage separates the seven kinds of bills scanned in the A-direction from 28 patterns (7 kinds of bills×4 directions). As a result, there remain 21 patterns which should be further separated. If the eighth output unit of the first stage outputs an output signal, slab values which are the same as those inputted to the input units of the first neural network are inputted to the second stage of the neural network. Seven units out of the eight units in the output layer of the second stage are assigned to bills of $1 through $100 scanned in the B-direction. Thus, the second stage separates the seven kinds of bills scanned in the B-direction from 21 patterns, and 14 patterns remain.

If the eighth output unit of the second stage outputs and output signal, slab values which are the same as those inputted to the input units of the first neural network are inputted to the third stage of the neural network. Seven units out of the eight units in the output layer of the third stage are assigned to bills of $1 through $100 scanned in the C-direction. Thus, the third stage separates the seven kinds of bills scanned in the C-direction from 14 patterns, and 7 patterns remain.

If the eighth output unit of the third stage outputs an output signal, slab values which are the same as those inputted to the input units of the first neural network are inputted to the fourth stage of the neural network. Seven units out of the eight units in the output layer of the fourth stage are assigned to bills of $1 through $100 scanned in the D-direction. Thus, the fourth stage separates the seven kinds of bills scanned in the D-direction from 7 patterns. If-the eighth output unit of the fourth stage outputs an output signal, the bill under examination is not a dollar bill.

Figure 29:
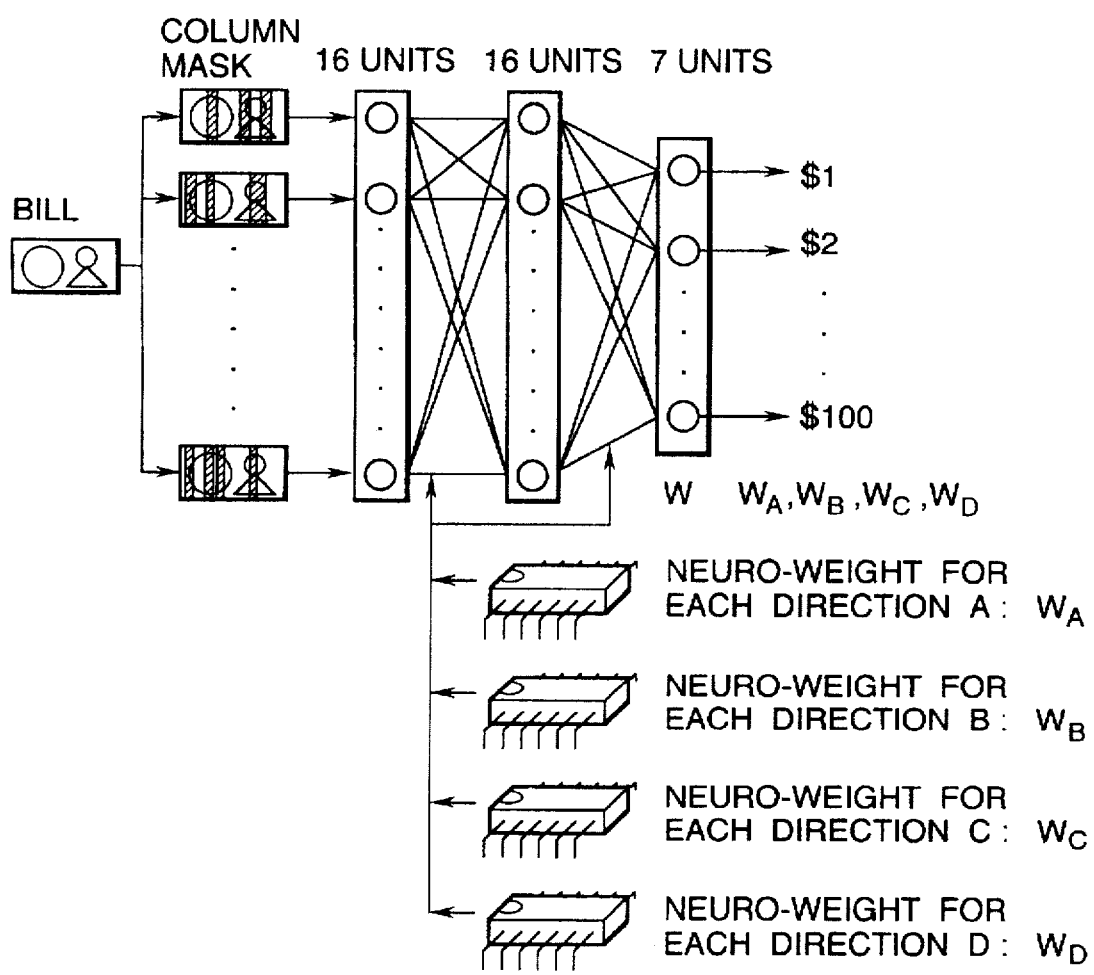
FIG. 29 is a Schematic diagram illustrating a neuro-bill recognition system using random masks according to the present invention, wherein weighting factors of the neural network are rewritten.

In the above example, the neural networks are physically connected in cascade. Alternatively, as illustrated in FIG. 29, the recognition controller may load a proper set of weight factors corresponding to each stage described above to the same single neural network circuit by replacing the set of the weight factors with another set of the weigh factors stored in respective ROMs 200 via hardware switches, thereby accomplishing sequentially the process equivalent to the above.

The weight factors of the neural network are rewritten via the learning. In this technique, just prior to the separation processing, the external controller forces these weight factors to be rewritten with weight factors adequate to the Separation processing. This technique allows the separation processing to be performed sequentially on the same slab values without increasing the physical scale of hardware.

The output of the decision unit 153 of the neural circuit is read into the CPU in the recognition system controller 160 for making decision. According to the decision result, if a bill is of the kind designated by the setting input means, the bill is transferred into the stacker 104. If the bill is one of the other kinds, the path switching mechanism 113 is driven so that the bill is transferred into the reject stacker 105. Then, the contents of the display 130 are updated. Via the hillpassage sensor (not shown) disposed just after the feeder 110, the recognition controller 160 counts the number of bills fed by the feeder 110. If the number to be counted is designated by the setting input means, the recognition controller 160 stops the transferring means when the counted number of bills has reached the designated number.

In the above embodiments, it is assumed that the pattern recognition is performed on U.S. dollar bills. However, the present invention may also be applied to the pattern recognition of bills of other countries and to other types of pattern recognition such as recognition of characters of vouchers, payment slips, securities, stocks, bonds, checks, etc., which are read via an OCR (Optical Character Reader). In the above examples, furthermore, a line sensor is used to obtain optical pattern images. Alternatively, an area sensor may also be used.

In the pattern recognition apparatus according to the present invention, as described above, the neural network has the capability of learning, and thus the recognition alogorithm is self-formed in the network. In the present invention, furthermore, the value (slab value) representative of an image is determined using strip-shaped masks arranged in horizontal or vertical directions in the preprocessing unit, and thus it is possible to reduce the scale of the neural network and the control system. Since the neural network includes nonlinear elements, it is possible to maintain hill recognition performance regardless of variation in contrast of an image data. In the present invention, furthermore, the strip-shaped masks enables reliable pattern recognition via the neural network regardless of displacement in location of an pattern image.

In the neuro-bill recognition apparatus using random masks according to the present invention, representative values (slab values) of an image are obtained via column masks arranged parallel to the shorter sides of a bill. This allows a reduction in scale of the neural network and control System. Furthermore, even if a shift in location of a bill occurs, reliable bill recognition is possible since the shift does not influence the slab values. In one mode of the present invention, the neural networks are connected in cascade so that high efficiency discrimination among a great number of categories (seven values of dollar bills, upside up, upside down, transfer directions) can be achieved.

Figure 30:
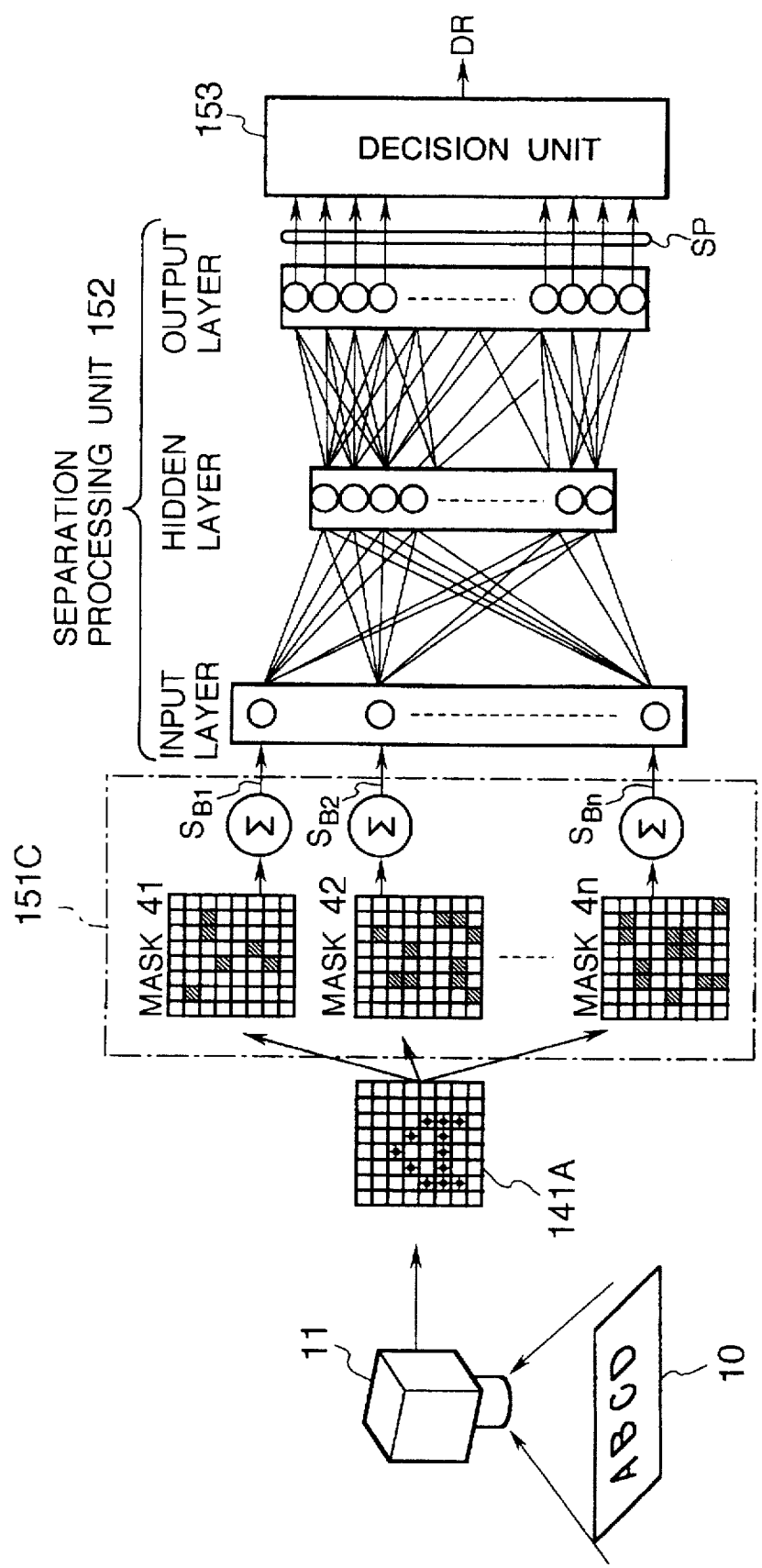
FIG. 30 is a block diagram illustrating an embodiment of a pattern recognition apparatus using mesh-shaped masks according to the present invention.

FIG. 30 is a block diagram illustrating an another embodiment of a currency-recognition apparatus according to the present invention. A bill 10 to be recognized is detected by an image sensor 11, and the detected image is subjected to proper image processing so as to obtain an input image 141A. The input image 141A is inputted to masks 41–4n in a pre-processing unit 151C. The sum of values provided from the respective masks 41–4n is calculated so as to obtain representative values SB1–SBn associated with the image. The representative values SB1–SBn associated with the image are inputted to the separation processing unit 152 of the neural network. The separation processing unit 152 calculates separation values SP using weights which have been optimized to recognize respective reference patterns of bills. The separation values SP are inputted to a decision unit 153. The decision unit 153 detects a maximum (or minimum) value of the separation values SP, and outputs a pattern corresponding to the maximum (or minimum) value as a pattern image of the object or the bill 10. The masks 41–4n in the pre-processing unit 151C are mesh-shaped masks each having a large number of rectangular segments wherein some of these rectangular segments are designated by random numbers to be closed. Rectangular segments of each mask 41–4n are closed at location different from those of other masks.

The pre-processing unit 151C including the mesh-shaped masks will be described further.

In the present invention, the mesh-shaped masks 41–4n are employed for the following reasons. In a binary image consisting of "0"s and "1"s arranged in an 8×8 matrix as shown in FIGS. 31A and 31B, if a slab value or the sum of all pixel values (the number of "1"s of a binary image, in the case of FIG. 30) is used as a characteristic parameter of an image, in FIG. 31A, "14" is obtained as a slab value characterizing character "E". Similarly, in FIG. 31B, "12" is obtained as a slab value characterizing character "H". In this way, it is possible to separate "E" from "H" by slab values. However, in some cases, images having different patterns can have the same slab value. For example, character "F" shown in FIG. 32A has a slab value of "10", while character "K" shown in FIG. 32B also has a slab value of "10". Therefore, it is impossible to separate "F" from "K". This problem can be solved by introducing a mesh-shaped mask wherein its specific portions corresponding to specific pixels of an input image are closed as shown in FIG. 33C. If the image of FIG. 32A is covered with the mask shown in FIG. 33C, then a resultant image becomes such as that shown in FIG. 33A, and thus the corresponding slab value becomes "7". Similarly, if the image of FIG. 32B is covered with the mask shown in FIG. 33C, then a resultant image becomes such as that shown in FIG. 33B. In this case, the corresponding slab value becomes "9". As can be seen from the above, the introduction of a mask allows separation between "F" and "K". In view of the above, the locations of a plurality of areas to be closed of a mask are properly selected in a manner such as shown in FIG. 33C so that various kinds of images can be separated from each other. The probability that only one mask of this kind can generate slab values which allow separation of various kinds of images is very small. However, if various masks are used, it is possible to give different slab values for the same image, as described above. In most cases, there are differences in slab values at some locations of series of slab values between images. Therefore, it is possible to improve the ability of separating images from each other by using various different masks. In terms of physics, use of different plural masks has the following meaning. If a three-dimensional object is observed from various different viewpoint, it is possible to obtain different information on the same object depending on the viewpoint. Use of various different masks means that an image is observed from various different viewpoints in a two-dimensional plane. Thus, as described above, it becomes possible that the same image can generated different various information.

In this case, an input image is covered with various different masks in preprocessing, and the sums of pixels which are not masked with masks give slab values SB1–SBn corresponding to respective masks, wherein these slab values SB1–SBn have one-to-one correspondence to neurons of the input layer.

Further, in the present invention, a method of adaptive information processing performed by a brain or a neural network of a living evolution is employed for discrimination of paper sheets wherein the discrimination ability is improved according to a genetic algorithm which simulates evolution processes of a living organism to be adapted to an environment, wherein the evolution processes are based on the information carried by a gene. The genetic algorithm is based on a model of evolution (genetic group) of the living organism in the natural world. That is, the algorithm is based on a simulation of processes in which in a group of individuals (a population) forming a generation, individuals having higher adaptability to an environment can survive other individuals, and furthermore crossover and mutation occur to form a next generation. In this algorithm, an objective function of an optimization problem corresponds to a correct recognition ratio of the paper sheets, a candidate for a solution corresponds to a mask pattern of an image of a paper sheet, a gene corresponds to an event of masking an image or not masking an image, a chromosome corresponds to a mask pattern which is also a candidate for a solution, an individual corresponds to a mask pattern consisting of a set of column masks.

First, an initial group is arranged. In general, a predetermined number of chromosomes are generated randomly, and therefore the initial group is arranged with the individuals selected randomly. Then, the adaptability of each individual is evaluated. Basically, the individuals having a high correct recognition ratio are regarded as having high adaptability. Arbitrary individuals having high adaptability are gathered, and selective mating is done on these gathered individuals. Basically, according to this algorithm, the individuals having high adaptability produce a greater number of descendants. Thus, the individuals having better genes which will expand over the entire group via the selective mating are determined (hereafter, these individuals will be referred to as "self" and "mates"), then crossover of genes is carried out. Basically, a chromosome is produced from a part of genes of the mates.

Then, a mutation is added. This is an operation to alter values of a part of genes included in a chromosome with a certain probability. The adaptability of the new group is evaluated, and a selection is done to produce a further next generation. In this way, selective mating and mutation are done to produce a new generation one after another. In each generation, when all individuals have been produced, a chromosome of each individual, that is, a mask pattern, is applied to the image patterns of the paper sheets, and a slab value which is the sum of non-masked portions is learned by the neural network thereby forming synapses between the neurons. That is, the weighting factors for the input, hidden and output layers are determined via the learning.

After completion of successive learning, the neural network having optimized the weight factors is evaluated for different data which have not been learned yet, and thus the generalization ability of each set of the slab values which are obtained from bill data is evaluated. In this evaluation, the column masks giving inputs which do not satisfy a minimum requirement in discrimination performance is removed from the pattern in that generation so as to accomplish further optimization of the column mask.

Referring to the accompanying drawings, there will be described an embodiment of a bill recognition apparatus according to a method of optimizing a mask for use in pattern recognition based on a genetic algorithm of the present invention.

Figure 34A:
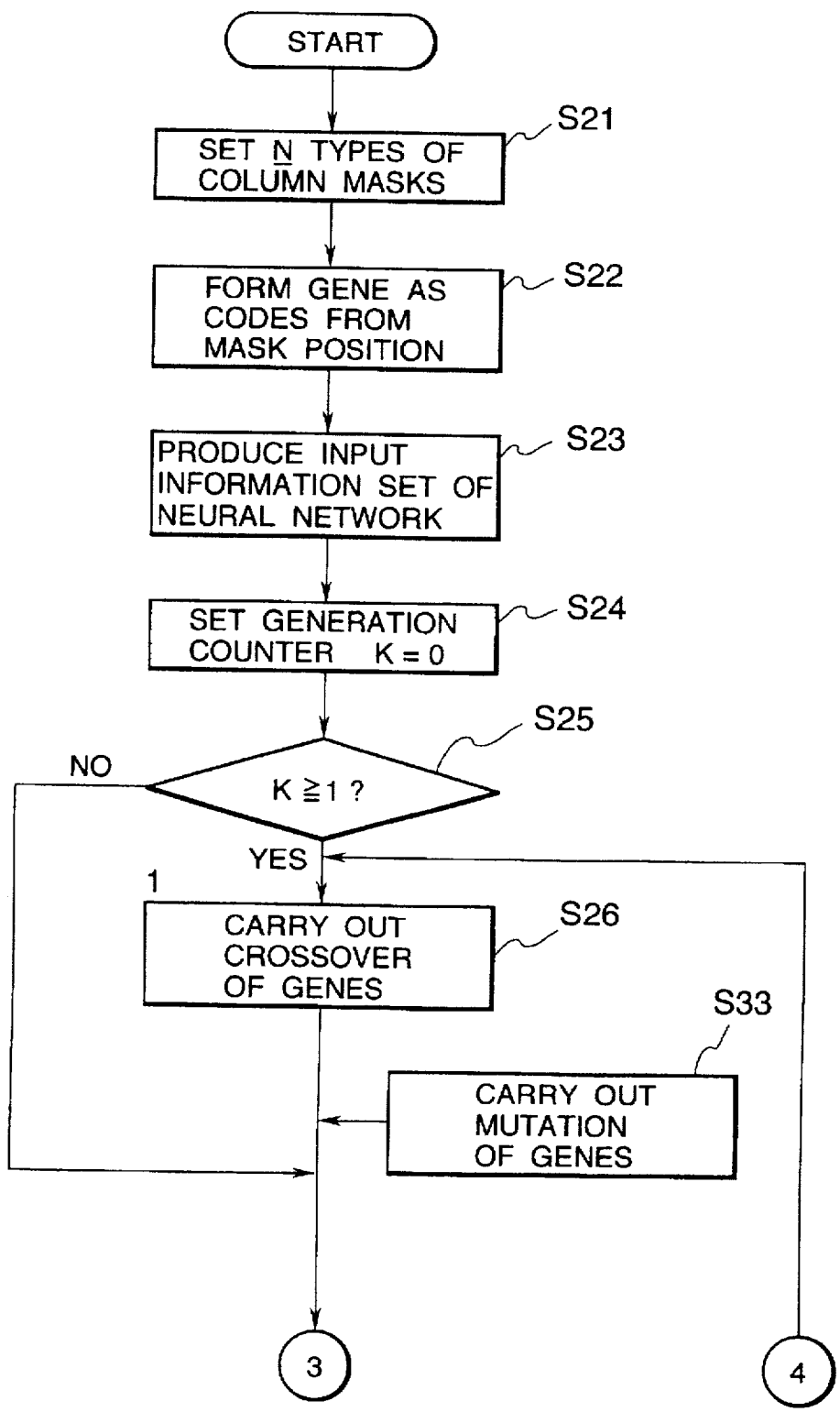
FIGS. 34A and 34B are flow charts illustrating an example of operation of the method according to the present invention.
Figure 34B:
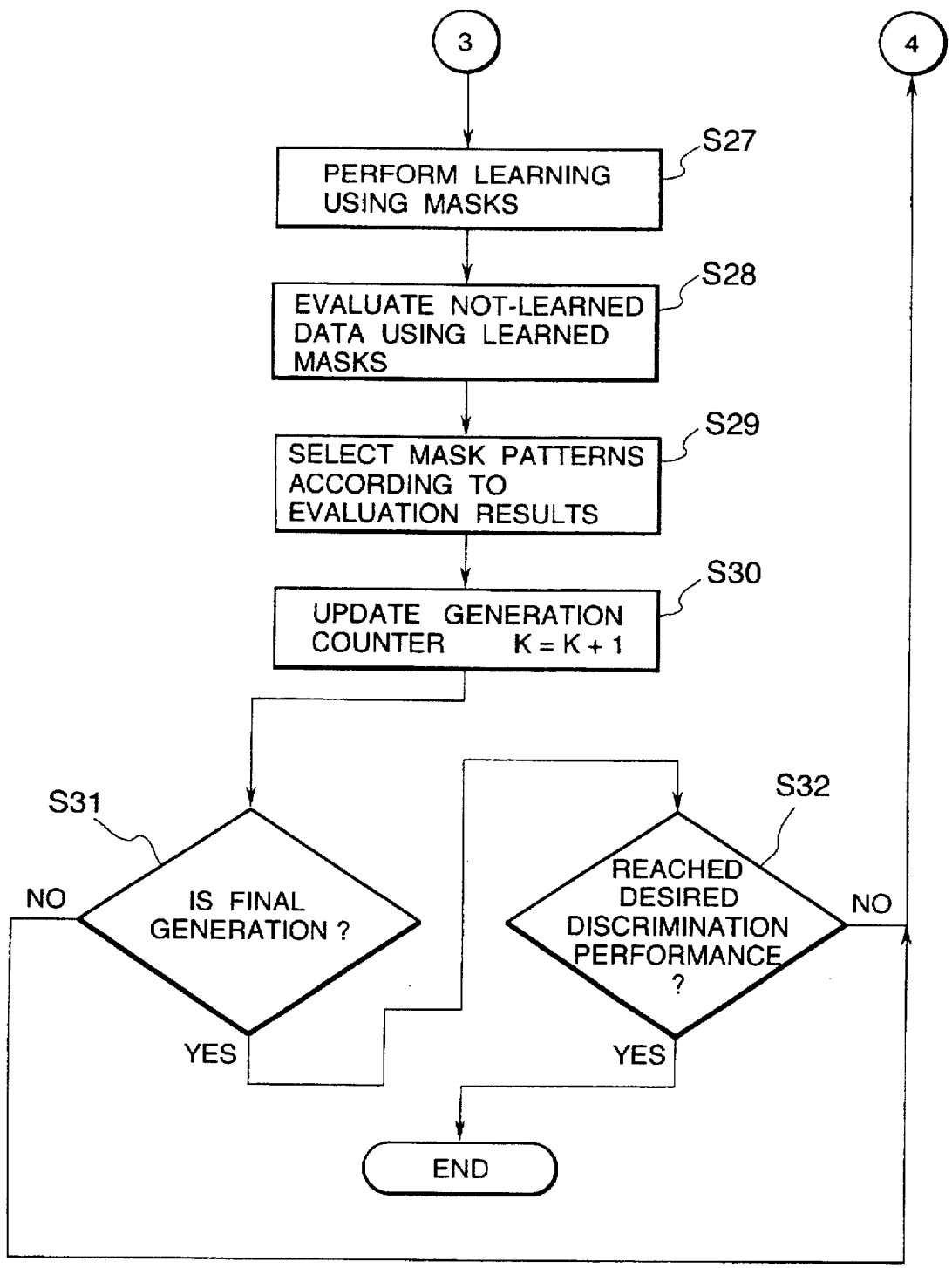

Referring to the flow charts of FIGS. 34A and 34B, a method of optimizing a mask for use in a pattern recognition by using a genetic algorithm according to the present invention will be described below.

First, setting of N types of arbitrary column masks is performed (Step S21) wherein each column mask is treated as a {1,0}bit, that is, a gene, and a column mask pattern consisting of 8 bits is treated as a chromosome. In this embodiment, one individual is formed with one column mask pattern or one chromosome (Step S22). Using the above initial individuals, the sum of the pixels which are not covered with any column masks so as to produce a slab value. From these slab values, input information to the neural network is produced (Step S23). For each input information produced, learning is carried out on separation into respective types of the bills. This learning on the Separation is carried out according to the back-propagation method, wherein the weight factors assigned among units of a hierarchical network are optimized based on given supervising data which uniquely defines relationships between inputs and outputs.

For example, the generalization abilities of three patterns A, B and C in a first generation shown in FIG. 35 are such as that the pattern A has a correct recognition ratio of 90%, the pattern B 92% and the pattern C 80% as shown in FIG. 37. Then, a part of genes are exchanged between masks in the first generation, that is, bits at specific locations are exchanged with each other (Steps S24–S26). In an example shown in FIG. 36, a half of the pattern A and a half of the pattern B are exchanged to produce a pattern A'. Then, a slab value, that is, an input to the neural network is produced using a new column mask whose genes or masking locations are newly determined by the above exchanging.

Similarly, new column masks are produced by partly exchanging genes between remaining other superior column mask. The above described successive processing is carried out for several generations so as to produce more superior column masks from superior column masks. In this way, the column mask is optimized step by step.

Figure 3A:
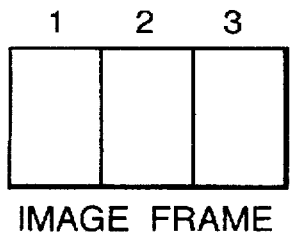
FIGS. 3A and 3B are schematic diagrams illustrating a specific example of a combination of masks.
Figure 3B:
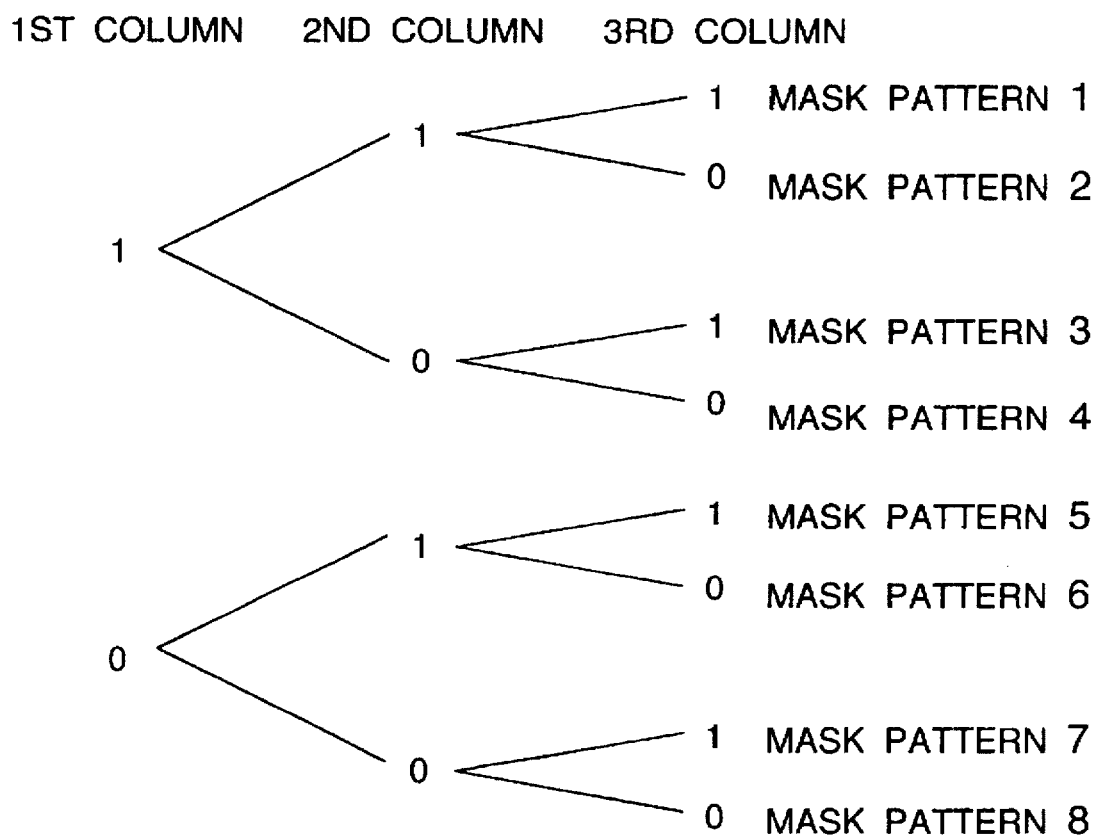

Furthermore, when a new column mask is produced, exchanging of genes between column masks after selection is modified by introducing mutation on arbitrary genes of column masks (Step S23). That is, "1"s at certain bits are changed to "0"s, or "0"s are changed to "1"s. The mutation should not occur frequently, and thus it is set to occur with a small probability. Using inputs produced in this way, the above described learning is performed (Step S27). Then, using data which have not been learned yet, combinations of genes, that is, mask patterns, which have not been removed in each generation are evaluated (Step S28). According to evaluation results, mask patterns having low abilities are removed (Step S29). Here, the term "removing" is used to imply such a selection that a removed individual is not used as a parent to produce a next generation. In the example shown in FIG. 3?, mask patterns B',B" and C" are removed.

Either if the above described processing has been carried out the predetermined number of times, or if a desired adaptability has been achieved (Steps S30–S32), the process is completed, and an individual which has showed the best recognition performance is employed as an optimized mask pattern.

Referring to an example in which seven types of U.S. dollar bills with respect to the same direction are separated or discriminated, a method of optimizing a mask according to the genetic algorithm will be described.

First, an initial group is arranged. In general, chromosomes are generated randomly for a predetermined number of individuals. Methods of determining the number of individuals and the length of a chromosome, and the method of coding are important themes in research of the genetic algorithms. However, in practice, these are now determined experimentally. In this embodiment, an individual is a combination of 16 chromosomes or 16 mask patterns. The initial group is constructed with mask patterns which have been shown a correct recognition ratio of about 80% of higher in evaluation of the generalization ability which has been carried out after the learning with arbitrary mask patterns. This algorithm relies on the fact that better individuals are regarded as having higher adaptability (or recognition ratio).

Figure 38B:
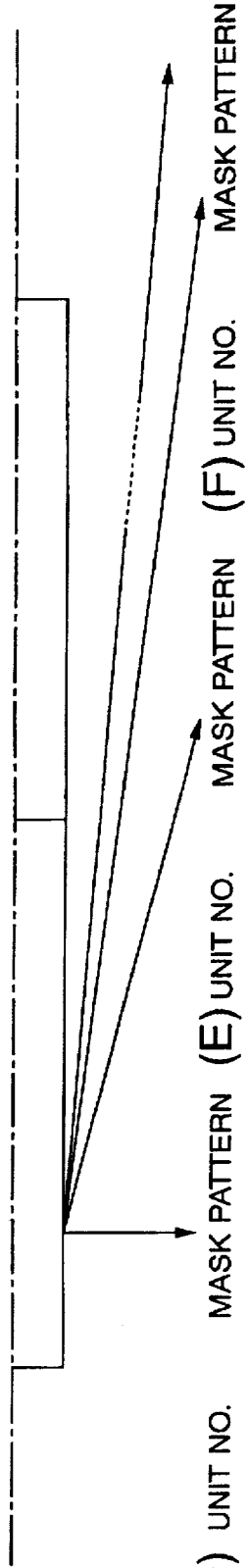
FIG. 38 is a schematic diagram illustrating a specific example of the optimization process according to the method of the present invention.

In an example shown in FIG. 38, numbers 1 through 16 associated with mask information represent unit numbers which are inputted as slab values to the neural network. Numbers 1, 2, 3, . . . , 4, 5, G in a row represent mask locations, wherein value 0 represents that the corresponding location is not masked and value 1 represents that the corresponding location is masked. The sum of image data of a picture at non-masked locations is inputted as a slab value to the input layer. In this example, the neural network comprises an input layer having 16 neurons, a hidden layer having 16 neurons, and an output layer having 7 neurons (corresponding to 7 types of U.S. dollar bills limited to a single direction). That is, image data of the bills taken in the same direction are used as input data. In a practical recognition apparatus for dollar bills, four neural networks of this type are cascaded so that the output signals can be obtained for four directions for each type of the bill. The generalization ability obtained may be such as that the pattern (A) has a recognition ratio of 90%, the pattern (B) 93% and the pattern (C) 83%. These patterns (A), (B) and (C) are employed as individuals in a first generation, and evolution will be introduced on these patterns.

When the adaptability of each individual has been determined, a selective mating is carried out based on the adaptabilities. Basically, according to this algorithm, individuals having high adaptability produce a greater number of descendants. Thus, the genes which form better individuals will expand over the entire group. In this embodiment, there can be $_3P_2=6$ of different crossover. In FIG. 38, for example, one-bit exchanging is carried out on the unit numbers 4, 7, 11 and 15 at locations 9, 0, 1, 2, 3, 4, 5 and 6 respectively. In the crossover, random numbers in the range from 1 to 16 are generated. For example, if "4" is given as a first random number to an individual, then the 4-th bit of the mask pattern having the unit number of "4" of the mate is taken as the value of the 4-th bit of the mask pattern having the unit number of "4" of the individual itself. If the given number is not "4", then the exchanging of bits is not performed.

Then, a second random number is generated. If the given random number is "7", then the 7-th bit of the mask pattern having the unit number of 7 of the mate is taken as the value of the 7-th bit of the mask pattern having the unit number of 7 of the individual itself. If the given random number is not "7", then the exchanging of bits is not performed. Furthermore, a third random number is generated. If the given number is "11", then the 11-th bit of the mask pattern having the unit number of "11" of the mate is taken as the value of the 11-th bit of the mask patterns having the unit number of "11" of the individual itself. Furthermore, a fourth random number is generated. If the given number is "15", then the 15-th bit of the mask pattern having the unit number of 15 of the mate is taken as the value of the 15-th bit of the mask pattern having the unit number of 15 of the individual itself. If the given number is not "15", then the exchanging of bits is not performed.

Now, the introduction of the mutation will be described. This is an operation to alter bit values of a certain gene or a mask pattern with a certain probability.

Mutation is not introduced to the mask patterns (chromosomes) having unit numbers 4, 7, 11 and 15 which have been mated. In the mutation, whether mutation occurs is first determined using a random number. That is, a random number in the range of {−1, 1} is generated, and the mutation is introduced to the corresponding individual only if the generated number has a value in the range from 0.5 to 1. If the given number is less than 0.5, then the mutation is not introduced to the corresponding individual in the corresponding generation.

If it has been decided that the mutation should be introduced, then which chromosome or which unit number of the mask pattern of the individual should be subjected to the mutation is determined by using a random number in the range from 1 to 16. For example, if the given random number is "1", then the mask pattern having the unit number of 1 is subjected to the mutation. As described above, the mask patterns having unit numbers 4, 7, 11 and 15 will not be subjected to the mutation since these mask patterns have been subjected to the mating. Therefore, even if the given random number is any one of the numbers including 4, 7, 11 and 15, the mutation is not introduced to the corresponding individual. This random number also determines the position at which the bit value is forced to be inverted. That is, in the mask pattern having the unit number 1, 1-st bit is inverted, the unit number 2-2nd bit, . . . , and the unit number 16 16-th bit. Then, whether the bit inversion should really be done or not is determined. From an arbitrary initial value, hundred random numbers in the range of {−1, 1} are generated. If ten or more generated numbers are in the range from 0.5 to 1, the bit inversion is performed. In the case of the mask pattern having the unit number 1, the "1" of 1-st bit is inverted as described above. Similarly, whether the mutation is introduced to the mask pattern having the unit number 2 is determined from a random number in the range from 1 to 16, and final decision whether the 2-nd bit should be inverted is made from the random numbers in the range of {−1,1}. Similar processing is performed on the mask patterns having the unit numbers 3, 5, 6, 8, 9, 10, 12, 13, 14 and 16. Six individuals in the second generation produced in this way are subjected to learning, and a neural network is formed based on the learning. Then, its generalization ability is evaluated. The results may be for example such as those denoted by (D), (E) and (F), in FIG. 38 wherein the recognition ratio is 95% in the case of (D), 94% in the case of (E) and 91% in the case of (F).

Then, a third generation is produced from the second generation in -the same manner as in the case of the second generation which was produced from the first generation. The mask patterns in all generations are ranked, and the best individual is employed as a final set of the mask patterns. The results are for example such as those denoted by (G), (H) and (I), wherein the discrimination ratio is 99% in the case of (G), 98% in the case of (H) and 96% in the case of (I). In the above example, the generation of grandchildren is produced from only the generation of children. Alternatively, ancestor (parents) may also be used directly in generation of descendants.

The probability and the location associated with the mutation may be arbitrarily given. According to the above described method, unlike the method in which masking location are simply determined by random numbers, useless images (for example, similar picture patterns, pixels having similar intensities, etc.) cannot be remained non-masked, and differences in images among various bills can be effectively reflected in input values (slab values) applied to the neural network. Thus, the learning on separation of types of bills can be performed at a higher speed, and the generalization ability can be improved. Furthermore, it is possible to more effectively obtain an optimized useful mask pattern for a shorter time compared to a technique in which the entire image pattern which is masked with column masks in examined.

In the above, pattern recognition of U.S. dollar bills has been described. However, the present invention may also be applied to pattern recognition for discrimination of the bills of other countries and discrimination of characters of vouchers, payment slips, securities, stocks, bonds, checks, etc. In the above example, a line sensor is used to obtain optical pattern images. Alternatively, an area sensor may also be used.

As described above, according to the method of the present invention, a mask used for a pattern recognition is optimized based on the genetic algorithm which employs the concepts of crossover, selection, and mutation in the genetic engineering. Thus, it is possible to obtain the best mask pattern for a short time by improving the mask pattern step by step in a manner similar to the evolution of living organisms. In addition, the learning ability of a neural network allows a superior algorithm for discrimination of paper sheets to be obtained.

It should be understood that many modifications and adaptation of the invention will become apparent to those skilled in the art and it is intended to encompass such obvious modifications and changes in the scope of the claims appended hereto.

What is claimed is:

1. A pattern recognition apparatus comprising:

an image sensor for optically detecting a pattern image of an object to be recognized;

a pre-processing unit for converting pattern image data detected by said image sensor into a plurality of representative values of the pattern image, using a plurality of area masks each having a plurality of rectangular segments wherein random rectangular segments are closed;

a memory unit for storing weights which have been adjusted to optimum representative values for decision images to be recognized;

a separation processing unit for receiving in parallel said plurality of representative values of the pattern image, and then calculating separation values corresponding to respective decision images within the pattern image using the weights stored in said memory unit; and a decision unit for detecting the maximum or minimum value of said separation values and then outputting a decision corresponding to the maximum or minimum value as the pattern image of the object.

2. A pattern recognition apparatus as claimed in claim 1, wherein said object is a bill or a coin.

3. A pattern recognition apparatus as claimed in claim 1, wherein said plurality of strip-shaped masks includes: a first strip-shaped mask whose strip-shaped area is arranged in a direction traversing an object transfer direction of said apparatus; and a second strip-shaped mask whose stripe-shaped area is arranged in a direction coincident with the object transfer direction.

4. A pattern recognition apparatus comprising:

an image sensor for optically detecting a pattern image of an object to be recognized;

a pre-processing unit for converting the pattern image data detected by said image sensor into a plurality of representative values of the pattern image, using a plurality of mesh area masks each having a large number of rectangular segments wherein random areas of some of said rectangular segments are closed;

a memory unit for storing weights which have been adjusted to optimum representative values for decision images to be recognized;

a separation processing unit for receiving in parallel said plurality of representative values of the pattern image, and then calculating separation values corresponding to respective decision images within the pattern image using the weights stored in said memory unit; and a decision unit for detecting the maximum or minimum value of said separation values and then outputting a decision corresponding to the maximum or minimum value as the pattern image of the object.

5. A pattern recognition apparatus as claimed in claim 4, wherein said object is a bill or a coin.

6. A neural bill-recognition apparatus using random masks, comprising:

image inputting means for inputting an optical pattern image of a paper sheet to be recognized;

first memory means for storing image data inputted by said image inputting means;

image extracting means for extracting an optical pattern image within the paper sheet from the image data stored in said first memory means;

pre-processing means for randomly covering said optical pattern image extracted by said image extracting means with a plurality of kinds of column masks, and for converting the total number of pixels of said optical pattern image which are not masked into slab values wherein said column masks are randomly formed as a plurality of strip-shaped area masks whose longer sides are arranged in a direction parallel to a transfer direction of the paper sheet;

second memory means for storing weights which have been adjusted to optimum values for decision patterns to be recognized;

separation processing means for receiving the slab values and then calculating separation values corresponding to respective decision patterns within the pattern image by using the weights wherein said separation processing means includes an input layer, a hidden layer and an output layer;

decision means for detecting the maximum or minimum value of said separation values and then outputting a decision corresponding to said maximum or minimum value representing an optical pattern image of said paper sheet; and a neural network comprising of at least said separation processing means and said decision means.

7. A neuro-bill recognition apparatus using random masks as claimed in claim 6, wherein said neural network is provided plurally, and plural neural networks corresponding to categories of said paper sheets to be discriminated are connected in cascade.

8. A neural bill-recognition apparatus using random masks as claimed in claim 6, wherein the weights stored in the second memory means are sequentially rewritten according to categories of said paper sheets to be discriminated.

9. A neuro-bill recognition apparatus using random masks as claimed in claim 6, wherein said paper sheet is a bill, and said image inputting means comprises a light emitting element, a line sensor and a data processing unit for processing an output signal from the sensor.

10. A neuro-bill recognition apparatus using random masks as claimed in claim 6 further including a paper image extract unit for extracting out only a desired paper image portion outputted from said memory means and inputting the extracted data into said neural network.

11. A neuro-bill recognition apparatus using random masks as claimed in claim 6, wherein weights of said neural network are composed of one set, and said one set is obtained by switching in turn plural ROMs having the weights stored therein.

12. A method of optimizing a mask for use in pattern recognition according to a genetic algorithm, comprising the steps of:

optically reading a pattern image of a paper sheet to be discriminated by a sensor;

storing pattern image data read by the sensor in a memory;

extracting an optical pattern image associated with only the paper sheet from the pattern image data stored in the memory;

masking the extracted optical pattern image with a plurality of kinds of column masks;

coding said column masks, and assigning genes to the coded column masks;

inputting an image data sum of pixel values which are not covered with a mask pattern comprising said column masks, to a neural network;

making the neural network learn the total value of the image data sum to recognize the paper sheet;

evaluating results of said step of making the neural network learn, and performing selection on the column masks according to whether the masks have achieved a predetermined discrimination ability level;

performing crossover of the genes on the mask patterns which have been selected, or introducing mutation to the genes, thereby alternating the genes on the mask patterns and creating an alternated generation; and making the neural network learn the total value of the image data sum to recognize the paper sheet with the crossover or mutated mask patterns in the alternated generation;

wherein the above steps are performed repeatedly within a predetermined number of alternations of generations until a predetermined goal of discrimination ability has been achieved; thereby performing optimum arrangement on said masks.

13. A method of optimizing as claimed in claim 12, wherein said masks for use in pattern recognition are according to a genetic algorithm and each of said column masks is treated as a chromosome which forms one individual mask.

14. A method algorithm as claimed in claim 12, wherein said learning is performed according to a back-propagation method, and weight factors assigned among units of a hierarchical network are optimized based on given supervising data which uniquely defines relationships between inputs and outputs.

15. A method algorithm as claimed in claim 12 further including the step of evaluating each generation and removing mask patterns having low ability to thereby not use a removed mask pattern as a parent mask pattern to produce a next generation.

16. A method algorithm as claimed in claim 12, wherein said paper sheet is a bill.

* * * * *